United States Patent
Ohtsu et al.

(10) Patent No.: US 10,843,601 B2
(45) Date of Patent: Nov. 24, 2020

(54) VEHICLE SEAT AND PREPARING METHOD FOR SEAT COVER OF VEHICLE SEAT

(71) Applicant: TOYOTA BOSHOKU KABUSHIKI KAISHA, Aichi-ken (JP)

(72) Inventors: Hideki Ohtsu, Aichi-ken (JP); Masaru Ueno, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 67 days.

(21) Appl. No.: 16/189,154

(22) Filed: Nov. 13, 2018

(65) Prior Publication Data

US 2019/0143860 A1 May 16, 2019

(30) Foreign Application Priority Data

Nov. 15, 2017 (JP) .................................. 2017-220236

(51) Int. Cl.
*B60N 2/58* (2006.01)

(52) U.S. Cl.
CPC ......... *B60N 2/5883* (2013.01); *B60N 2/5891* (2013.01)

(58) Field of Classification Search
CPC .... B60N 2/5883; B60N 2/5891; B60N 2/609; B60N 2/5816; B60N 2/6018
USPC ....................................... 297/452.58, 452.62
See application file for complete search history.

(56) References Cited

U.S. PATENT DOCUMENTS

| | | | | | |
|---|---|---|---|---|---|
| 1,862,377 | A | * | 6/1932 | Harper | A41D 27/24 112/424 |
| 4,844,539 | A | * | 7/1989 | Selbert | A47C 31/11 297/228.13 |
| 5,492,073 | A | * | 2/1996 | Abraham | B60R 21/235 112/441 |
| 6,886,479 | B1 | * | 5/2005 | Hori | B60N 2/5883 112/470.27 |
| 2005/0081771 | A1 | * | 4/2005 | Kromm | D05B 23/00 112/475.08 |
| 2016/0375807 | A1 | * | 12/2016 | Kageyama | B60N 2/5883 297/452.61 |
| 2018/0022255 | A1 | * | 1/2018 | Abe | B60N 2/5883 297/452.58 |
| 2018/0093596 | A1 | * | 4/2018 | Kumagai | B60N 2/0228 |

(Continued)

FOREIGN PATENT DOCUMENTS

JP 4563136 8/2010

*Primary Examiner* — Mark R Wendell
(74) *Attorney, Agent, or Firm* — Greenblum & Bernstein, P.L.C.

(57) ABSTRACT

A vehicle seat including: a seat pad including: a first surface portion; a second surface portion; and a peripheral edge portion forming a boundary between the first and second surface portions, and a seat cover including: a first cover portion; a second cover portion; and a sewn portion in which a first seam allowance of the first cover portion and a second seam allowance of the second cover portion are overlapped in a state of being turned back inwardly and are sewn together, the sewn portion being arranged along the peripheral edge portion, and a portion of the sewn portion arranged along the peripheral edge portion is formed of the first seam allowance and the second seam allowance which is shorter than the first seam allowance, and the first seam allowance is tilted toward in a manner of facing either the first surface portion or the second surface portion.

12 Claims, 17 Drawing Sheets

(56) References Cited

U.S. PATENT DOCUMENTS

2019/0031062 A1\* 1/2019 Suzuki ................. B60N 2/5883
2019/0031063 A1\* 1/2019 Suzuki ................. B60N 2/5883
2019/0308535 A1\* 10/2019 Abe ........................ B68G 7/05

\* cited by examiner

VEHICLE SEAT AND PREPARING METHOD FOR SEAT COVER OF VEHICLE SEAT

CROSS-REFERENCE TO RELATED APPLICATIONS

This application claims priority from Japanese Patent Application No. 2017-220236 filed on Nov. 15, 2017, the entire contents of which are incorporated herein by reference.

TECHNICAL FIELD

The present disclosure relates to a vehicle seat which includes a seat pad forming a seat outer shape and a seat cover covering the seat pad, and in which a sewn portion serving as a sewn position of the seat cover is arranged along a peripheral edge of the seat pad, and a preparing method for the seat cover.

BACKGROUND

This type of vehicle seat includes a seat pad which forms a seat outer shape and elastically supports an occupant, and a seat cover which covers the seat pad. The seat cover is a surface material which configures a design surface of the seat, and is formed by sewing a plurality of cover pieces, and a sewn portion is formed at a seam portion between adjacent cover pieces. The sewn portion is a position where seam allowances of the cover pieces are overlapped in a state of being turned back inwardly and sewn by a sewing line, and is arranged at a back side of the seat cover along the seam portion of the cover piece. Then, while covering the seat pad with the seat cover, the sewn portion on the back side of the seat cover is arranged, for example, on a peripheral edge of the seat pad. Thereby, the seam portion (sewing line) of the cover pieces is arranged along the peripheral edge of the seat pad to configure a part of the design of the seat. In this type of configuration, if a tilting direction of each seam allowance is uneven, the sewing line is meandered and the appearance deteriorates. Therefore, each seam allowance which forms the sewn portion is arranged on the seat pad so as to be tilted in the same direction.

In the above configuration, there are cases where a part of the peripheral edge of the seat pad may be curved from the viewpoint of improving the design of the seat. In this case, it is necessary to dispose the seat cover along a curved portion from the viewpoint of shape reproducibility of the seat. At this time, the occurrence of partial unevenness in the seat cover due to the occurrence of a peripheral length difference in each seam allowance forming the sewn portion should be avoided. For example, a cover disclosed in JP-B-4563136 has two cover slices that correspond to the cover pieces, and the seam allowances of the cover slices are both shortened to form a sewn portion. Therefore, by applying the technique of JP-B-4563136, both seam allowances forming the sewn portion are partially shortened, and then the sewn portion in which both seam allowances are shortened is arranged at the curved portion of the peripheral edge of the seat pad. By shortening the seam allowance which forms the sewn portion in this way and reducing the influence of the peripheral length difference, the seat cover can be arranged neatly along the curved portion to contribute to improving the shape reproducibility of the seat.

Since the above vehicle seat is arranged in a vehicle compartment together with other vehicle seats, there is a demand for the both vehicle seats to have a sense of unity in design at this time. For this reason, it can be said that the appearance of the vehicle seat and the other vehicle seats is preferably to be the same as much as possible, and the appearance of a cover portion of a curved seat peripheral edge which is particularly a conspicuous portion is preferably to be similar. Here, in a seat cover forming the design surface of the other vehicle seat, the seam allowance of the sewn portion is not shortened, and the seat cover of the portion has an appropriate thickness by tilting both seam allowances. However, in the seat cover of the vehicle seat, both seam allowances of the sewn portion are shortened at a curved portion of the peripheral edge of a seat pad, and thus the seat cover is relatively thin in this portion. Therefore, there is a concern that when comparing the vehicle seat and the other vehicle seats, the seat peripheral edge is moderately raised in the other vehicle seats, while the vehicle seat may give an impression that a part of the seat peripheral edge is unnaturally recessed. Further, even in the case of considering the vehicle seat only, it should be avoided from giving an impression that a curved seat peripheral edge portion is unnaturally recessed with respect to other peripheral edge portions as much as possible.

SUMMARY

The present disclosure has been made in view of the above points, and the problem to be solved by the present disclosure is to arrange the sewn portion of the seat cover in a more natural way with good appearance on the curved portion of the peripheral edge of the seat pad.

An aspect of the present disclosure is a vehicle seat including: a seat pad which forms a seat outer shape, the seat pad including: a first surface portion; a second surface portion which is arranged orthogonal to the first surface portion; and a peripheral edge portion which forms a boundary between the first surface portion and the second surface portion, and a seat cover which covers the seat pad, the seat cover including: a first cover portion which covers the first surface portion; a second cover portion which covers the second surface portion; and a sewn portion in which a first seam allowance of the first cover portion and a second seam allowance of the second cover portion are overlapped in a state of being turned back inwardly and are sewn together by a sewing line, the sewn portion being arranged along the peripheral edge portion, and a portion of the sewn portion arranged along the peripheral edge portion is formed of the first seam allowance and the second seam allowance which is shorter than the first seam allowance, and the first seam allowance is tilted toward a corresponding cover portion side so as to be arranged in a manner of facing either the first surface portion or the second surface portion.

DETAILED DESCRIPTION

Figure 1:
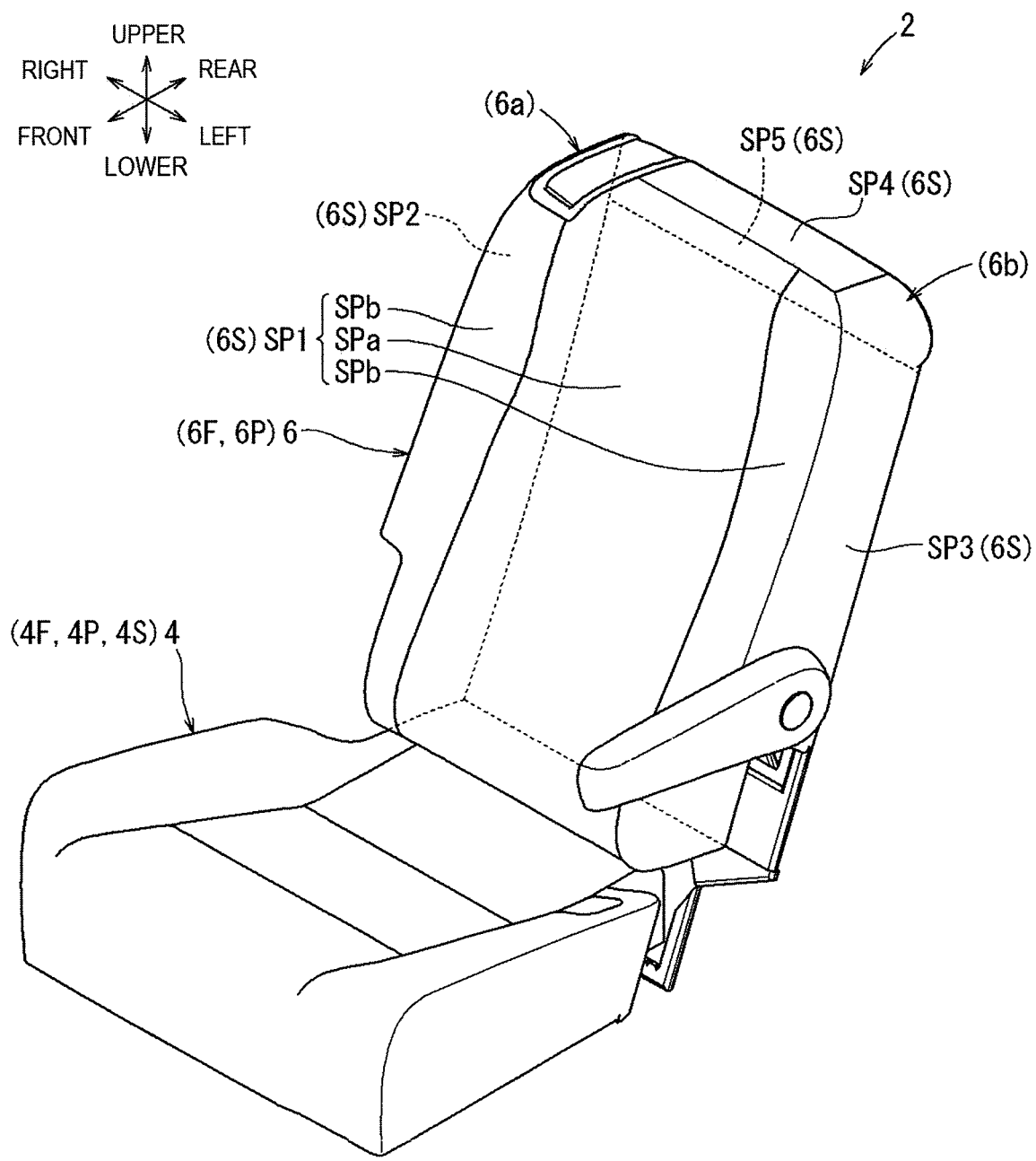
FIG. 1 is a perspective view of a vehicle seat.

Hereinafter, embodiments for implementing the present disclosure will be described with reference to FIGS. 1 to 17. In each drawing, for convenience, arrows indicating a front-rear direction, a left-right direction, and an upper-lower direction of a vehicle seat are appropriately illustrated. Further, in a drawing in which only a seat cover is illustrated, an arrow indicating each direction may be appropriately illustrated with reference to a state in which the seat cover is disposed on the vehicle seat. In addition, for convenience, in order to distinguish a first cover portion from a second cover portion, hatches may be added in the drawings for illustration. In addition, in FIGS. 12 to 16, for convenience, in order to distinguish each cover piece, different hatches may be added for illustration.

Figure 2:
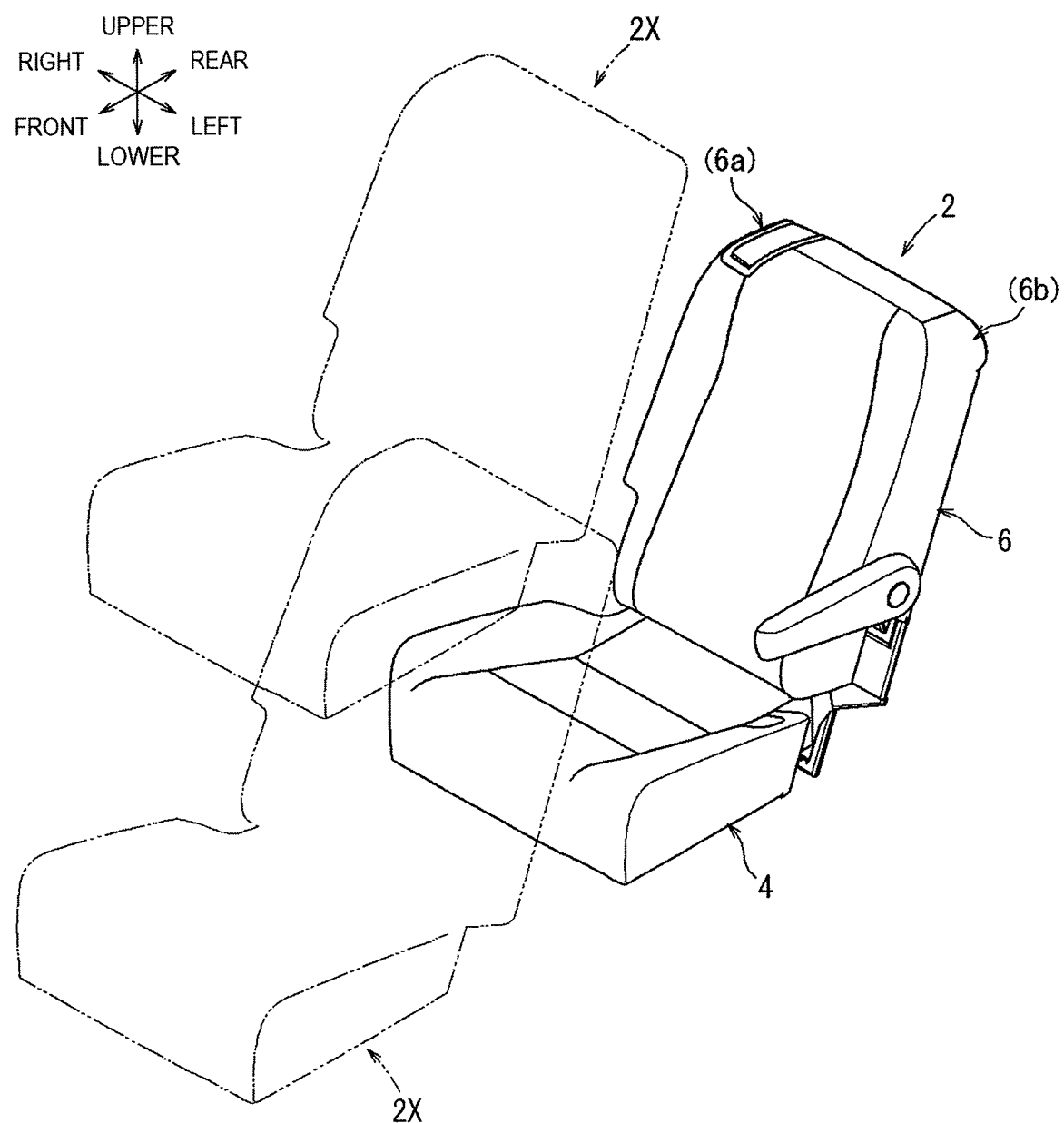
FIG. 2 is a perspective view of the vehicle seat and other vehicle seats.

A vehicle seat 2 in FIG. 1 includes a seat cushion 4 and a seat back 6. The seat configuration members (4, 6) respectively includes a seat frame (4F, 6F) which forms a seat framework, a seat pad (4P, 6P) which form a seat outer shape, and a seat cover (4S, 6S) which covers the seat pad. A lower portion of the seat back 6 (described in detail later) is tiltably connected to a rear portion of the seat cushion 4, and an armrest (reference numeral thereof is omitted) is provided on a left side of the seat back 6. Here, as shown in FIG. 2, for example, the vehicle seat 2 can be arranged in a vehicle compartment together with one or more other vehicle seats 2X. The other vehicle seats 2X can be arranged separately in front and rear, left and right (front and right in FIG. 2) of the vehicle seat 2. The other vehicle seats 2X have substantially the same basic configuration with the vehicle seat 2 although a shape of a shoulder or the like is slightly different, and further have an appearance similar to that of the vehicle seat 2. By making the appearance of the vehicle seat 2 consistent with the appearance of the other vehicle seats 2X in this manner, it is possible to make the vehicle seats 2, 2X have a sense of unity in design.

[Seat Back]

Figure 3:
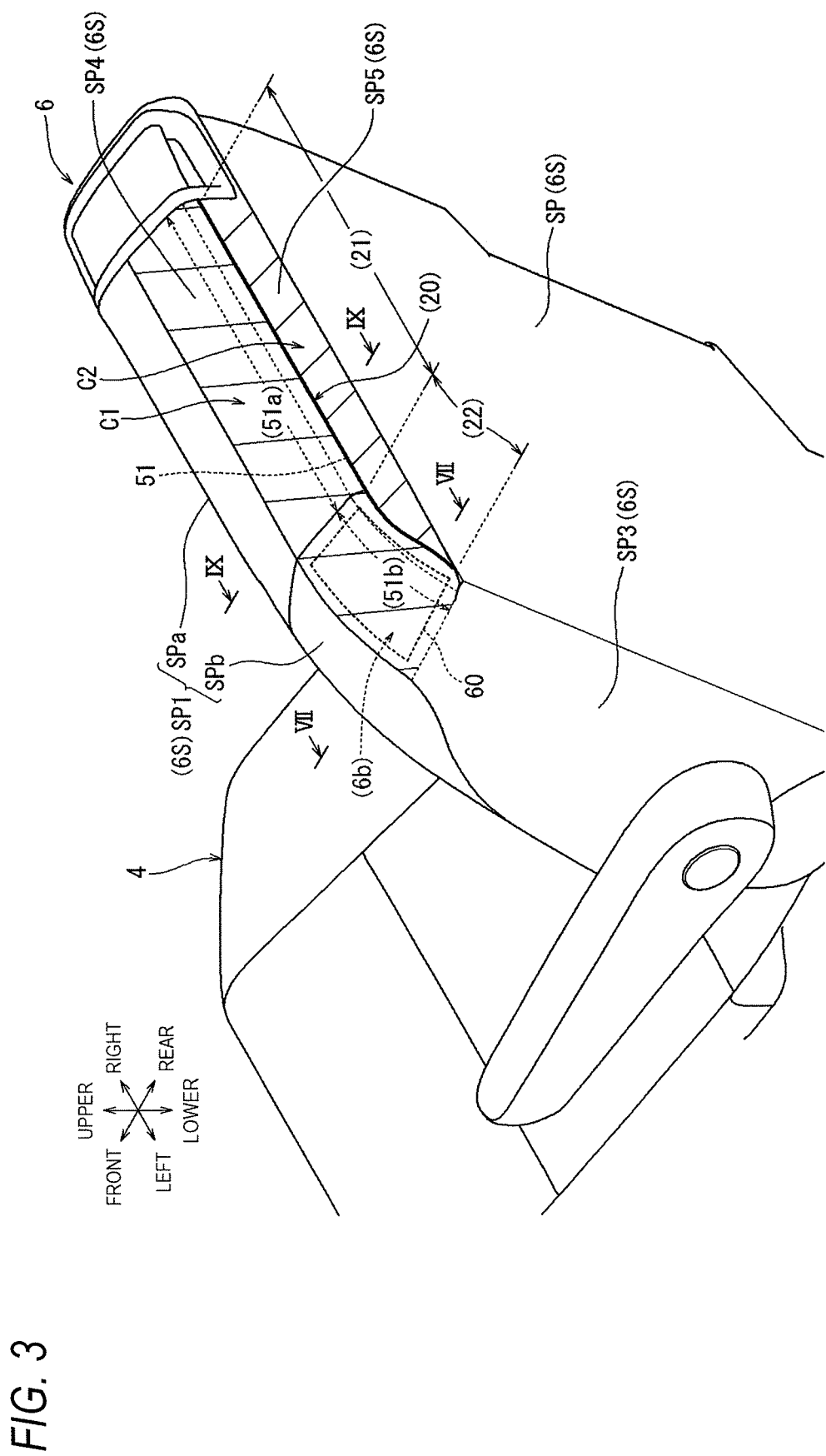
FIG. 3 is a perspective view of the vehicle seat as seen from an upper rear side.

The seat back 6 illustrated in FIGS. 1 and 3 is a member serving as a backrest for an occupant, and includes the above basic configurations 6F, 6P, and 6S. The seat back 6 has a rectangular shape which is substantially vertically elongated in a front view in an upright posture, and has a right shoulder 6a which is a corner portion on an upper right side, and a left shoulder 6b which is a corner portion on an upper left side. The right shoulder 6a is a portion where a right side of an upper surface intersects a right surface in a substantially orthogonal manner, and the left shoulder 6b is a portion connected to a left surface in a state where a left side of the upper surface gradually curves downward as it goes to the left side. In the seat back 6, a seat pad 6P is covered with a seat cover 6S while being arranged on a seat frame 6F (not shown) (details of each member will be described later). At this time, with reference to FIG. 3, a sewn portion (51) serving as a sewn position of the seat cover 6S is arranged along a curved portion (22) of a peripheral edge of the seat pad 6P located at the left shoulder 6b. In this type of configuration, it is desirable to arrange the sewn portion (51) of the seat cover 6S in a more natural way with good appearance on the curved portion (22) of the peripheral edge of the seat pad 6P in consideration of the appearance of the other vehicle seats 2X. Therefore, in the present embodiment, the sewn portion (51) of the seat cover 6S is arranged in a more natural way with good appearance on the curved portion (22) of the peripheral edge of the seat pad 6P by the configuration described later. Hereinafter, each configuration will be described in detail.

[Seat Pad]

Figure 4:
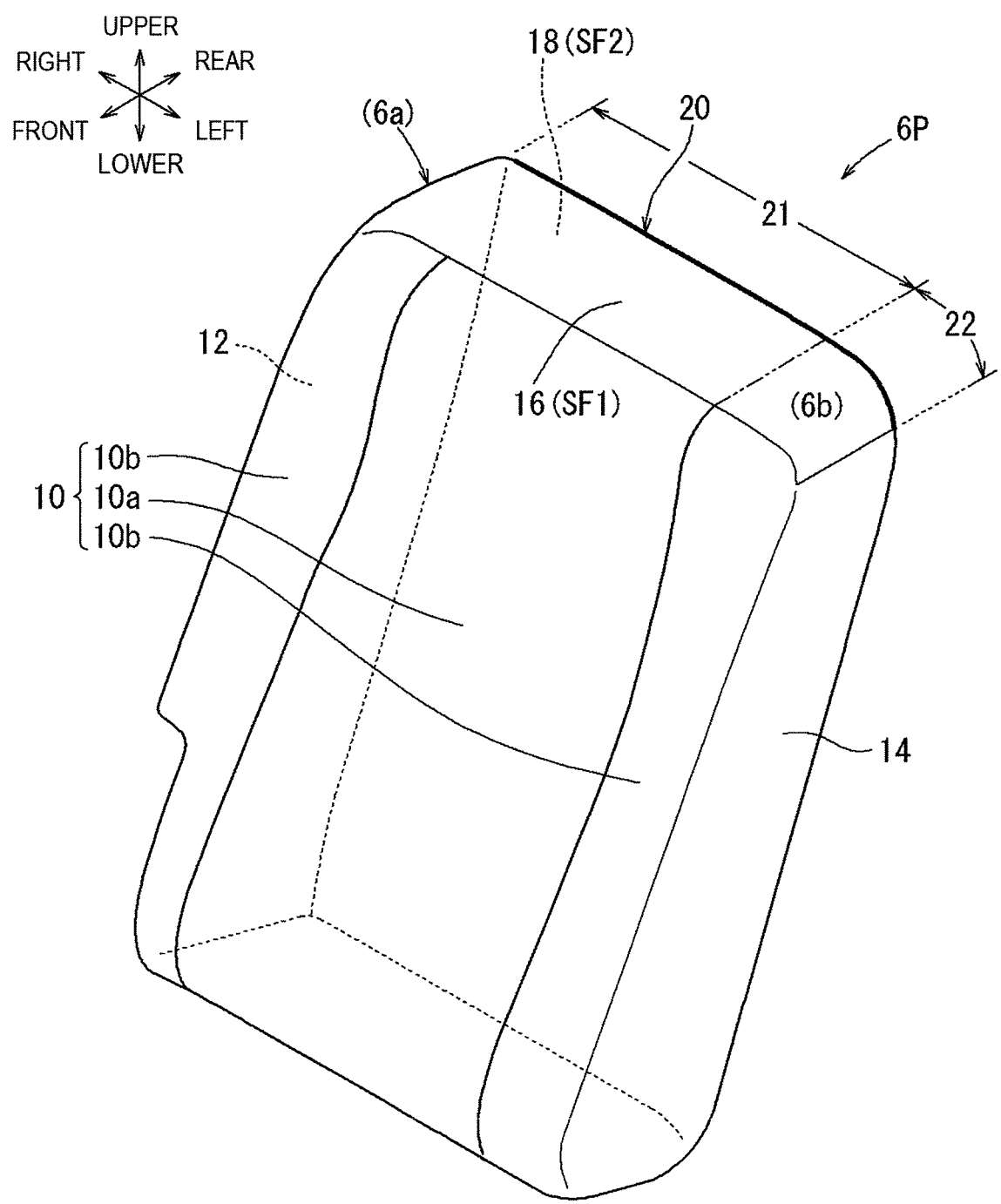
FIG. 4 is a perspective view of a seat pad.

Referring to FIG. 4, the seat pad 6P is a member which forms a seat outer shape and can elastically supports the occupant, and has a plurality of surface portions (a front surface portion 10, a right surface portion 12, a left surface portion 14, an upper surface portion 16, a rear surface portion 18), and a peripheral edge portion 20 described later. The seat pad 6P is arranged on the frame-shape seat frame 6F substantially forming an arch-shape in FIG. 1, and the seat frame 6F is formed of a metal having excellent rigidity. A material of the seat pad 6P is not particularly limited, and foamed resin such as polyurethane foam (density: 10 kg/m$^3$ to 60 kg/m$^3$) can be exemplified. The front surface portion 10 is a portion forming a front surface serving as a seating surface of the seat pad 6P. The front surface portion 10 has a main part 10a at the center in a seat width direction and side parts 10b arranged on both left and right sides of the main part 10a, and each top plate side part 10b relatively projects forward. The right surface portion 12 is a portion forming a right side surface of the seat pad 6P, and the left surface portion 14 is a portion forming a left side surface of the seat pad 6P.

[Upper Surface Portion (First Surface Portion) and Rear Surface Portion (Second Surface Portion)]

Referring to FIG. 4, the upper surface portion 16 is a portion forming the upper surface of the seat pad 6P, and configures a first surface portion SF1 of the seat pad 6P. The upper surface portion 16 serving as the first surface portion SF1 has a substantially flat surface from the right side to the center, and a corner portion on the right side forms an outer shape of the right shoulder 6a, and a corner portion on the left side forms an outer shape of the left shoulder 6b. Therefore, the corner portion on the left side of the upper surface portion 16 is a curved surface which is gradually curved downward as it goes to the left side. The rear surface portion 18 is a portion forming a rear surface of the seat pad 6P, and configures a second surface portion SF2 of the seat pad 6P. The rear surface portion 18 serving as the second surface portion SF2 extends downward (orthogonally) from a rear side of the upper surface portion 16 serving as the first surface portion SF1. An upper end side of the rear surface portion 18 has a substantially linear shape from the right side to the center following a rear edge of the upper surface portion 16, and the left side is curved following the left side of the upper surface portion 16.

[Peripheral Edge Portion]

Referring to FIG. 4, the peripheral edge portion 20 is an edge portion of the seat pad 6P which forms a boundary between the upper surface portion 16 serving as the first surface portion SF1 and the rear surface portion 18 serving as the second surface portion SF2. The peripheral edge portion 20 has a shape which substantially follows an upper end shape of the rear surface portion 18, and includes a general edge portion 21 and a curved edge portion 22 which are continuously provided. The general edge portion 21 is a portion extending substantially linearly in a left-right direction from the right side to the center, and is formed continuously from the right side of the peripheral edge portion 20 to the curved edge portion 22. The curved edge portion 22 is a portion which forms the left side of the peripheral edge portion 20, and is arranged at a rear portion of the corner portion on the left side (a portion corresponding to the left shoulder 6b) of the upper surface portion 16. The curved edge portion 22 is a portion curved with a curvature larger than that of the general edge portion 21. The curved edge portion 22 is gradually curved downward along the left shoulder 6b as it goes to the left, and is provided between the general edge portion 21 and the other peripheral edge (reference numeral thereof is omitted) on a left surface portion 14 side.

[Seat Cover]

Figure 7:
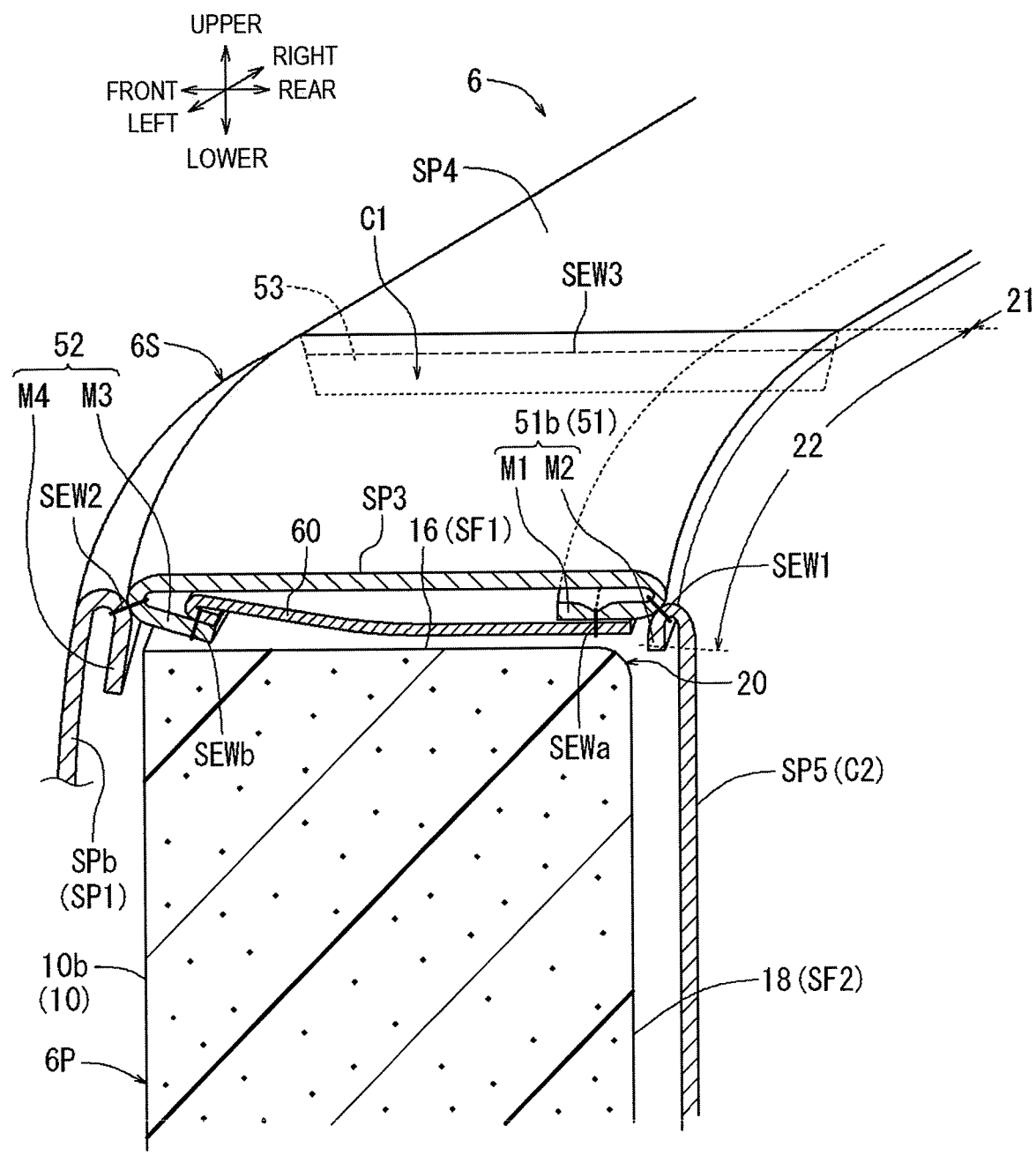
FIG. 7 is a perspective view of a seat back taken along line VII-VII in FIG. 3.

Referring to FIGS. 1 and 3, the seat cover 6S is a surface material configuring a design surface of the seat back 6, and includes a plurality of cover pieces (a front cover piece SP1, a right cover piece SP2, a left cover piece SP3, an upper cover piece SP4, a rear cover piece SP5 or the like) (in each drawing, for convenience, a specific cover piece is denoted by a specific reference numeral, and other cover pieces are denoted by the reference numeral SP). The material of each cover piece is not particularly limited, and cloth (woven fabric, knitted fabric, non-woven fabric) or leather (natural leather, synthetic leather) can be exemplified, and a pad material such as a urethane lamination or back base cloth (not shown) such as nonwoven fabric can be appropriately attached to a back surface of each cover piece. As shown in FIG. 3, the first cover portion C1 and the second cover portion C2 described later are formed on the seat cover 6S (in FIG. 3, for convenience, different hatchings are added to illustrate each cover portion). Further, as shown in FIG. 7, a plurality of sewn portions (a first sewn portion 51, a second sewn portion 52, a third sewn portion 53 or the like) described later which are sewn positions of adjacent cover pieces are formed in the seat cover 6S (in FIG. 7, for convenience, only a specific sewn portion is illustrated).

Figure 5:
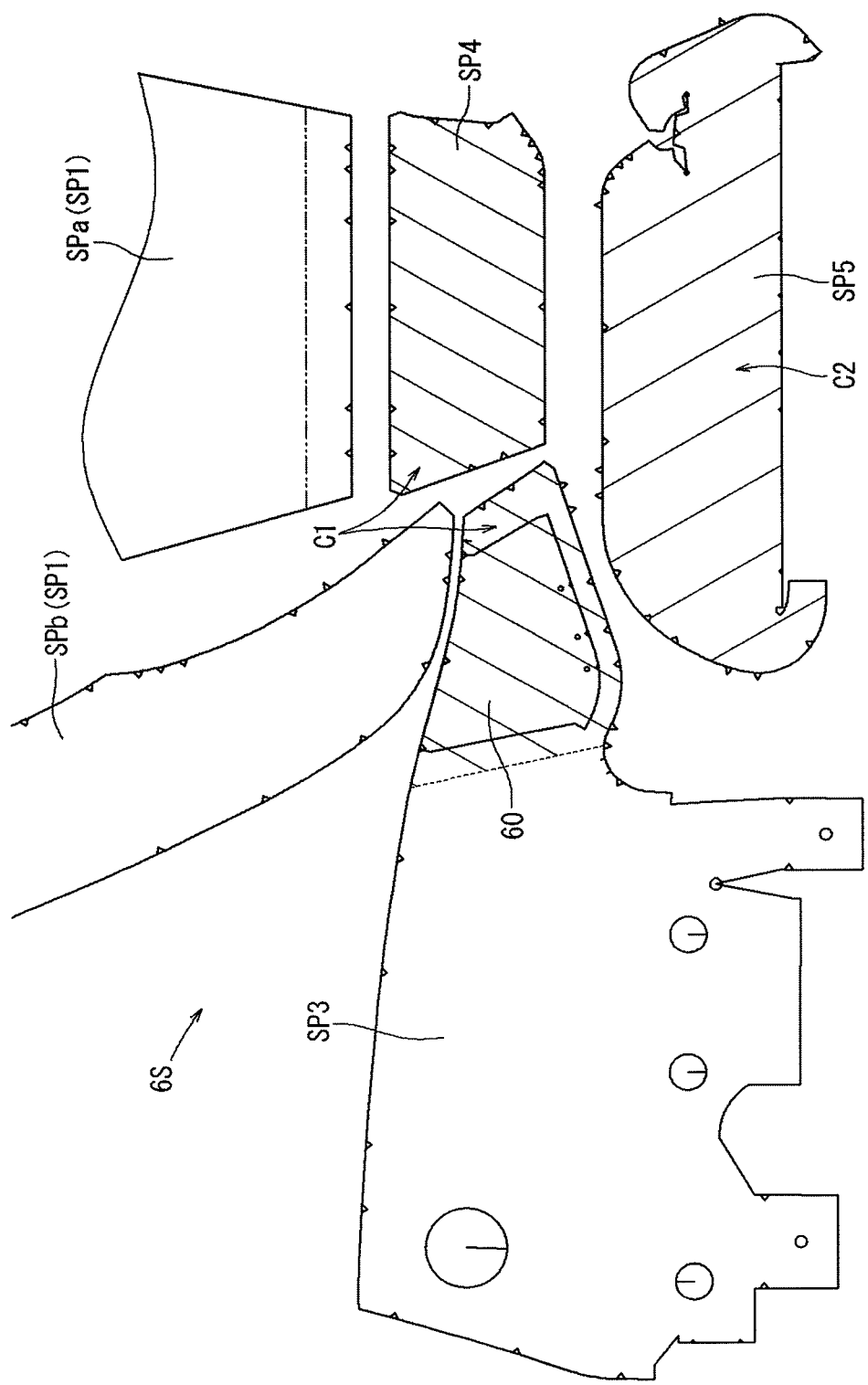
FIG. 5 is an unfolded view of a part of cover pieces forming a seat cover.
Figure 6:
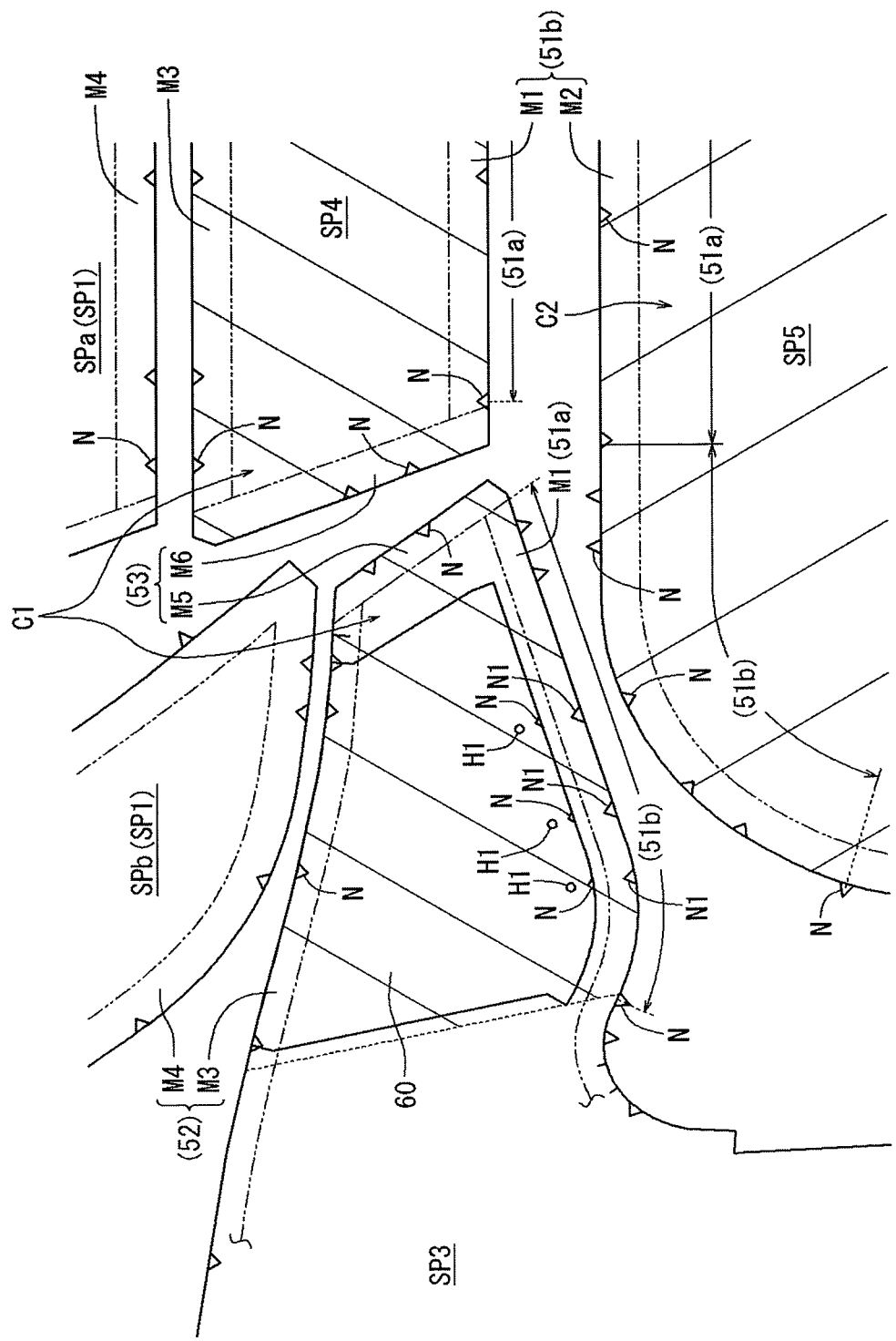
FIG. 6 is an unfolded view showing a part of the cover pieces in an enlarged manner.

Here, referring to FIGS. 1 and 4, the front cover piece SP1 is a cover piece covering the front surface portion 10 of the seat pad 6P, and is formed of a central cover slice SPa covering the main part 10a and left and right side cover slices SPb covering the side parts 10b. The right cover piece SP2 is a cover piece which covers the right surface portion 12 of the seat pad 6P. Referring to FIGS. 3 and 4, the left cover piece SP3 is a cover piece which covers a portion from the left surface portion 14 of the seat pad 6P to the corner portion on the left side (a portion corresponding to the left shoulder 6b) of the upper surface portion 16. In the left cover piece SP3, referring to FIGS. 4 and 5, a portion (hatched portion in FIG. 5) covering the left side of the upper surface portion 16 is relatively narrow, and a portion (non-hatched portion) covering the right surface portion 12 is relatively wide. Referring to FIGS. 3 and 4, the upper cover piece SP4 is a cover piece which covers the upper surface portion 16 (a portion except for the left side) of the seat pad 6P. The rear cover piece SP5 is a cover piece which covers an upper portion of the rear surface portion 18 of the seat pad 6P. Referring to FIGS. 5 and 6, an outer edge of each cover piece SP1 to SP5, etc. is provided with a plurality of mark portions N described later serving as marks at the time of sewing, and further, a part of an outer edge of the left cover piece SP3 is provided with a positioning portion N1 described later.

[First Cover Portion and Second Cover Portion]

As shown in FIG. 3, the first cover portion C1 and the second cover portion C2 are formed on the seat cover 6S at specific cover pieces (SP3, SP4, SP5). Referring to FIG. 3, the first cover portion C1 is a portion of the seat cover 6S which covers the upper surface portion 16 (first surface portion SF1) of the seat pad 6P. The first cover portion C1 is a substantially rectangular portion which is elongated in the left-right direction following the upper surface portion 16, and is formed of the upper cover piece SP4 and a narrow portion of the left cover piece SP3 as shown in FIGS. 5 and 6. The second cover portion C2 is a portion of the seat cover 6S which covers an upper portion side of the rear surface portion 18 (second surface portion SF2) of the seat pad 6P. The second cover portion C2 is configured by the rear cover piece SP5 having a trapezoidal shape elongated in the left-right direction, and an upper edge side serving as an upper base has a shape following the peripheral edge portion 20 of the seat pad 6P shown in FIGS. 3 and 4.

[First Sewn Portion (Sewn Portion of the Present Disclosure)]

Referring to FIG. 7, the seat cover 6S is provided with a plurality of sewn portions (the first sewn portion 51 to the third sewn portion 53 or the like). In each of the sewn portions, seam allowances of adjacent cover pieces are sewn by a corresponding sewing line (SEW1, SEW2 or the like). The first sewn portion 51 is a portion corresponding to the sewn portion of the present disclosure, and is arranged along the peripheral edge portion 20 of the seat pad 6P. The first sewn portion 51 is a sewn position of both cover pieces SP3 and SP4 forming the first cover portion C1 and the rear cover piece SP5 forming the second cover portion C2. That is, the first sewn portion 51 is formed of a first seam allowance M1 which is a rear edge of the first cover portion C1, a second seam allowance M2 which is an upper edge of the second cover portion C2, and a first sewing line SEW1 extending in the left-right direction. Referring to FIGS. 5 and 6, the first seam allowance M1 of the first cover portion C1 is formed on the narrow portion of the left cover piece SP3 and the upper cover piece SP4 separately, and the second seam allowance M2 of the second cover portion C2 is formed on the rear cover piece SP5.

[Curved Sewn Portion]

Figure 8:
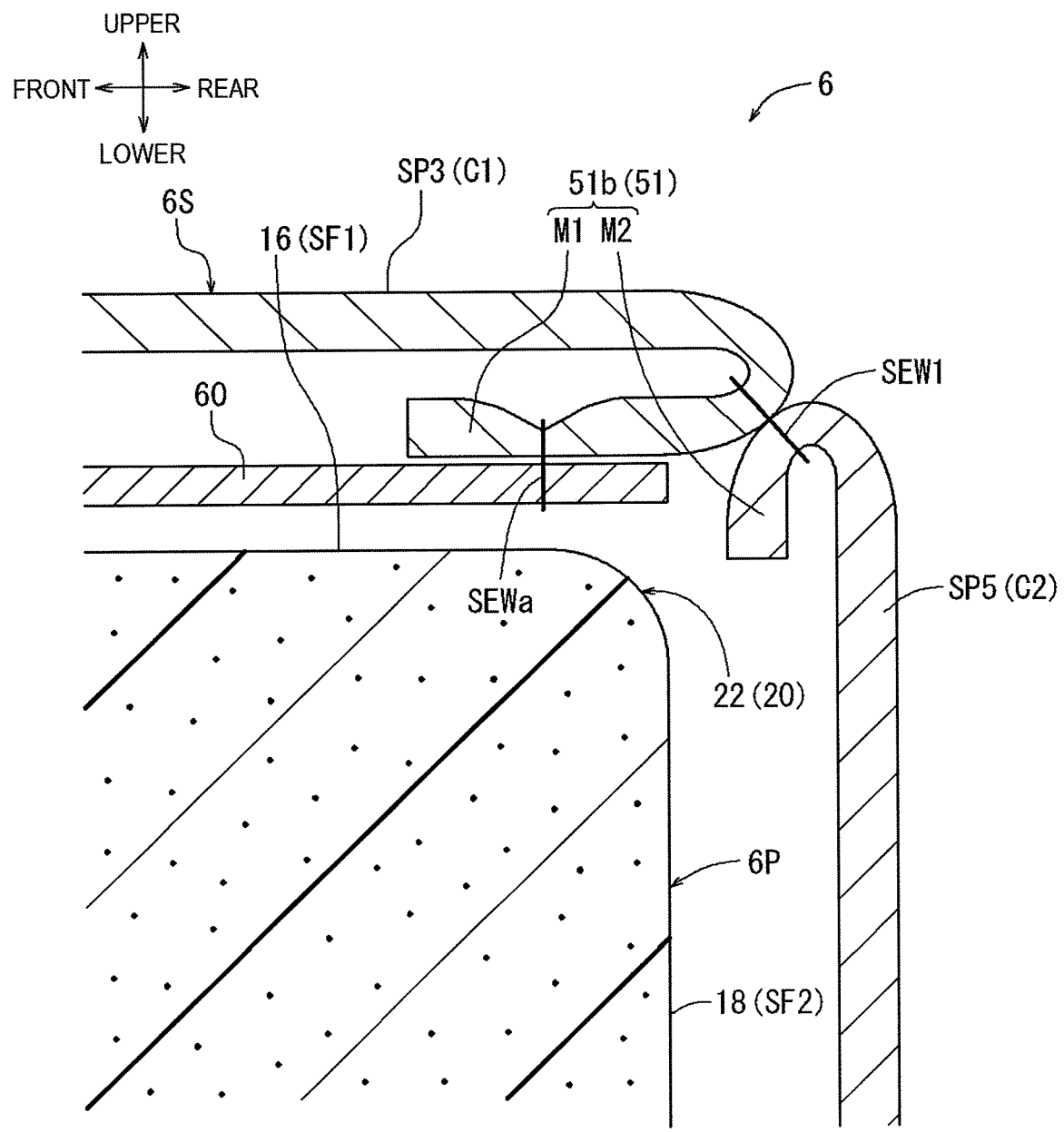
FIG. 8 is an enlarged cross-sectional view of a part of the seat back at a curved edge portion.

Referring to FIG. 3, the first sewn portion 51 is divided into the general sewn portion 51a and the curved sewn portion 51b. Here, referring to FIGS. 7 and 8, the curved sewn portion 51b is a portion arranged along the curved edge portion 22 of the seat pad 6P. In the curved sewn portion 51b, as shown in FIG. 8, different lengths are intentionally provided for the seam allowances M1 and M2 of the cover portions C1 and C2, and the second seam allowance M2 is shorter than the first seam allowance M1. The length of the first seam allowance M1 and second seam allowance M2 refers to the length from the first sewing line SEW1 to a tip end of each seam allowance. The length of the second seam allowance M2 is preferably set to be shorter than the first seam allowance M1 and not necessarily to be tilted. For example, a ratio of the length of the second seam allowance M2 to the first seam allowance M1 can be set to ⅓ or less, and the second seam allowance M2 can be cut in a vicinity of the first sewing line SEW1. The first seam allowance M1 of the curved sewn portion 51b is tilted forward by the maintaining member 60 described later.

[General Sewn Portion]

Figure 9:
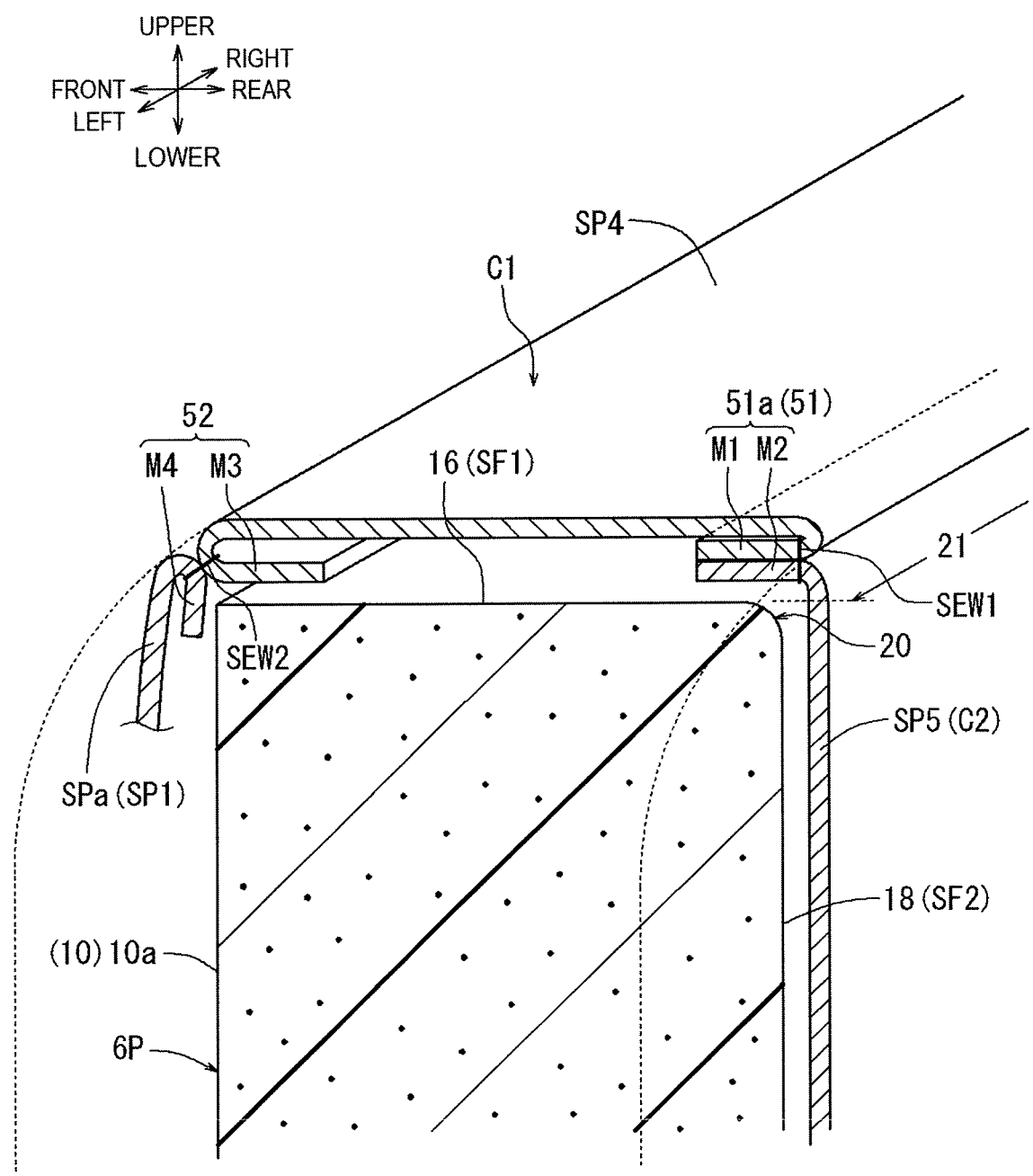
FIG. 9 is a perspective view of the seat back taken along line IX-IX in FIG. 3.
Figure 10:
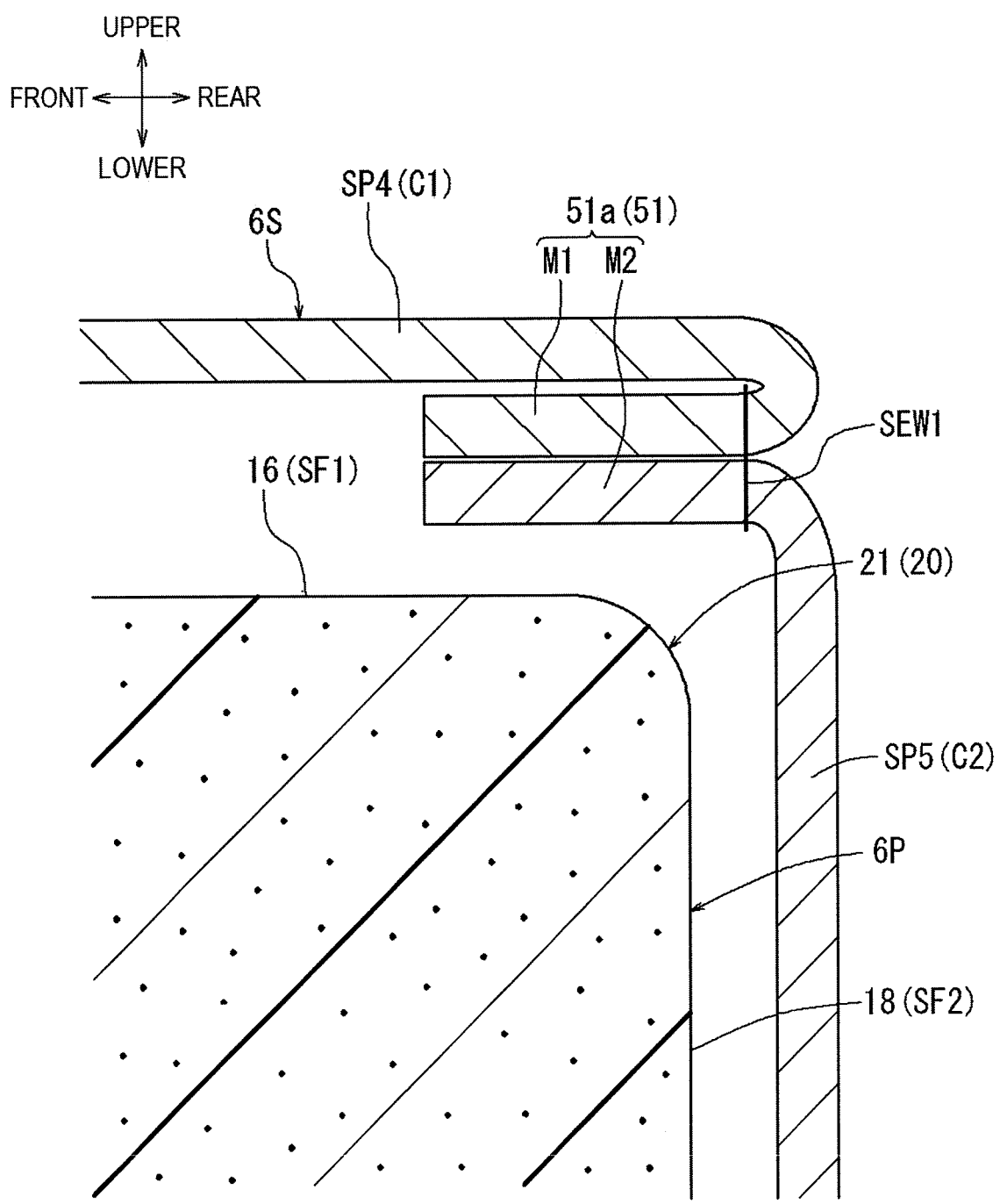
FIG. 10 is an enlarged cross-sectional view of a part of the seat back at a general edge portion.
Figure 11:
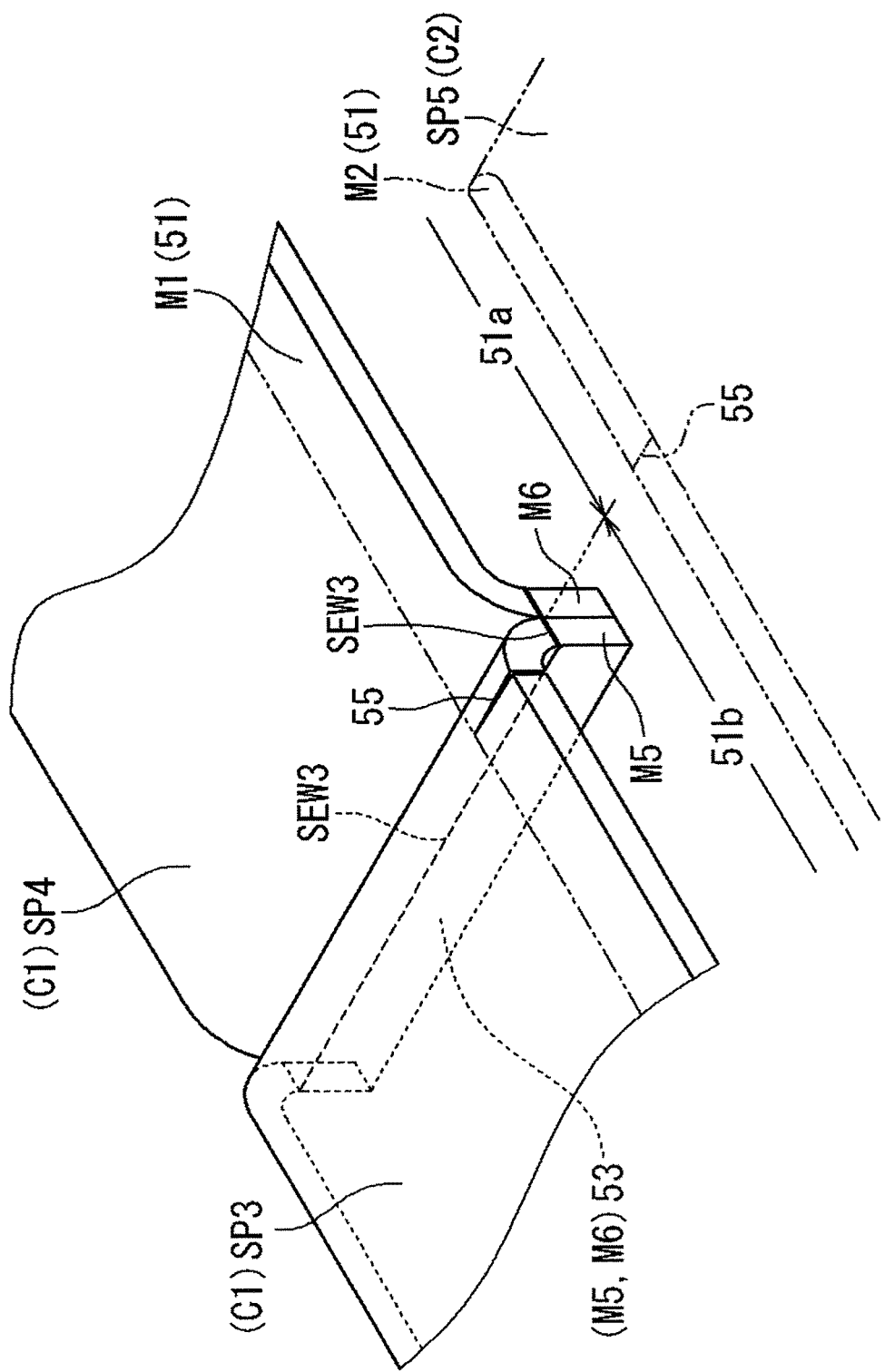
FIG. 11 is a perspective view of a part of a first cover portion.

Referring to FIGS. 9 and 10, the general sewn portion 51a is a portion arranged along the general edge portion 21 of the seat pad 6P. In this general sewn portion 51a, as shown in FIG. 10, different lengths are not intentionally provided for the first seam allowance M1 and the second seam allowance M2. That is, in the present embodiment, length of the first seam allowance M1 and the second seam allowance M2 of the general sewn portion 51a is set to be the same as the length of the first seam allowance M1 of the curved sewn portion 51b. The first seam allowance M1 and the second seam allowance M2 of the general sewn portion 51a are in a state of being tilted forward similarly to the first seam allowance M1 of the curved sewn portion 51b. Referring to FIG. 11, a dividing portion 55 which divides the first seam allowance M1 and the second seam allowance M2 is provided at the boundary between the general sewn portion 51a and the curved sewn portion 51b. The configuration of the seam allowance of the general sewn portion 51a and the configuration of the seam allowance of the curved sewn portion 51b can be changed with the dividing portion 55 as the boundary.

[Second Sewn Portion (Opposite Side Sewn Portion of the Present Disclosure)]

The second sewn portion 52 shown in FIG. 7 is a portion corresponding to an opposite side sewn portion of the present disclosure. The second sewn portion 52 is a sewn position of the first cover portion C1 and the front cover piece SP1, and is provided on an opposite side of the first sewn portion 51. The second sewn portion 52 is formed of a front seam allowance M3 which is a front edge of the first cover portion C1 (the cover pieces SP3 and SP4), an upper seam allowance M4 which is an upper edge of the front cover piece SP1, and a second sewing line SEW2 extending in the left-right direction. In the second sewn portion 52, difference in length between the seam allowances M3 and M4 is not intentionally provided, and the length of the seam allowances M3 and M4 is substantially the same.

[Third Sewn Portion (Sewn Portion of the Present Disclosure)]

The third sewn portion 53 shown in FIG. 7 is a portion corresponding to other sewn portion of the present disclosure, and is a sewn position of the upper cover piece SP4 and the left cover piece SP3. The third sewn portion 53 traverses the first cover portion C1 in the front-rear direction, and a rear end of the third sewn portion 53 intersects the boundary between the curved sewn portion 51b and the general sewn portion 51a of the first sewn portion 51. Referring to FIGS. 5 and 11, the third sewn portion 53 is formed of a right seam allowance M5 which is a right edge of the left cover piece SP3, a left seam allowance M6 which is a left edge of the upper cover piece SP4, and a third sewing line SEWS extending in the front-rear direction. In the third sewn portion 53, difference in length between the seam allowances M5 and M6 is not intentionally provided either, and the length of the seam allowances M5 and M6 is substantially the same.

[Maintaining Member]

Referring to FIG. 7, the maintaining member 60 is a member which maintains the first seam allowance M1 in the curved sewn portion 51b in a state of being tilted toward the corresponding cover piece side, and has a plurality of positioned portions H1 described later. As shown in FIGS. 5 and 6, the maintaining member 60 is a substantially rectangular planar member as seen from the upper side, and shapes of a front edge and a rear edge of the maintaining member 60 are substantially the same as that of corresponding edges of the left cover piece SP3. As a material of the type of the maintaining member 60, the materials exemplified in each cover piece can be used, and it is desirable to use a material which is less stretchable than the left cover piece SP3 serving as the first cover portion C1. For example, a surface material (for example, cotton cloth) in which fibers are densely entangled than the left cover piece SP3 can be used as the maintaining member 60. Further, a surface material using a constituting yarn which is less stretchable than the constituting yarn of the first cover portion C1 can be used as the maintaining member 60. Here, a dimension of the maintaining member 60 in the front-rear direction and left-right direction is not particularly limited as long as the tilted state of the first seam allowance M1 can be maintained, and in the present embodiment, a length of the maintaining member 60 in the front-rear direction is shorter than that of the left cover piece SP3. That is, referring to FIG. 13, length (L2) of the maintaining member 60 in the front-rear direction is set to be shorter than length (L1) of the left cover piece SP3 from a front edge to a rear edge. The length (L1) of the left cover piece SP3 from the front edge to the rear edge corresponds to a length of the first cover portion from one edge portion to the other edge portion in the present disclosure.

[Seat Cover Forming Method]

Referring to FIGS. 11 to 16, when preparing the seat cover 6S, adjacent cover pieces are sewn together in a first step to fourth step described later, thereby forming the corresponding sewn portions 51 to 53 or the like. In the present embodiment, the first step to the fourth step described later are performed in this order, but the order of the second step, the third step, and the fourth step can be exchanged as necessary. Further, in the present embodiment, shortening of the second seam allowance M2, attaching the maintaining member 60, and forming the dividing portion 55 are performed at appropriate timing. Since the basic sewing method for each cover piece is substantially the same, a preparing method for the seat cover 6S will be described below by exclusively using the first cover portion C1 and the second cover portion C2 as an example.

[First Step (Forming the Third Sewn Portion)]

The first cover portion C1 shown in FIG. 11 is formed in the first step, and the left cover piece SP3 and the upper cover piece SP4 are sewn together to form the third sewn portion 53. In the first step, in a state where the left cover piece SP3 and the upper cover piece SP4 are overlapped in a state of being turned back inwardly, the seam allowances M5 and M6 are sewn together by the third sewing line SEW3. At this time, the left seam allowance M6 and the right seam allowance M5 are provided with the mark portions N at appropriate intervals at corresponding positions shown in FIG. 6. Each mark portion N can be formed by cutting a triangular notch from an edge of the corresponding seam allowance, or by providing a triangular projection thereon. Therefore, the left seam allowance M6 and the right seam allowance M5 are sewn together by the third sewing line SEW3 in a state where the mark portions N are aligned with the marks to form the third sewn portion 53. In the first cover portion C1 thus formed, the third sewn portion 53 and the third sewing line SEW3 extend in the front-rear direction, and the left cover piece SP3 and the upper cover piece SP4 are further unfolded into a planar shape with the third sewing line SEW3 as a base point.

[Forming the Dividing Portion]

Here, before and after the first step, the dividing portion 55 which divides the second seam allowance M2 at an appropriate position can be formed on the second cover portion C2. The dividing portion 55 is a slit-shaped cut of the second seam allowance M2 provided at a position corresponding to the third sewn portion 53, and can divide the second seam allowance M2 on the general sewn portion 51a side and the second seam allowance M2 on the curved sewn portion 51b side. Similarly, the first cover portion C1 can also be provided with a dividing portion 55, and the dividing portion 55 of the first cover portion C1 can be provided at a position substantially consistent with the dividing portion 55 of the second cover portion C2, and typically provided at a position adjacent to the third sewn portion 53. The dividing portion 55 of the first cover portion C1 is also a slit-shaped cut of the first seam allowance M1, and can divide the first seam allowance M1 on the curved sewn portion 51b side and the first seam allowance M1 on the general sewn portion 51a side. The seam allowance configuration of the curved sewn portion 51b shown in FIG. 8 and the seam allowance configuration of the general sewn portion 51a shown in FIG. 10 can be smoothly changed without difficulty in the vicinity of the boundary therebetween by the dividing portion 55 of each of the cover portions C1 and C2.

[Second Step (Forming the First Sewn Portion)]

Figure 12:
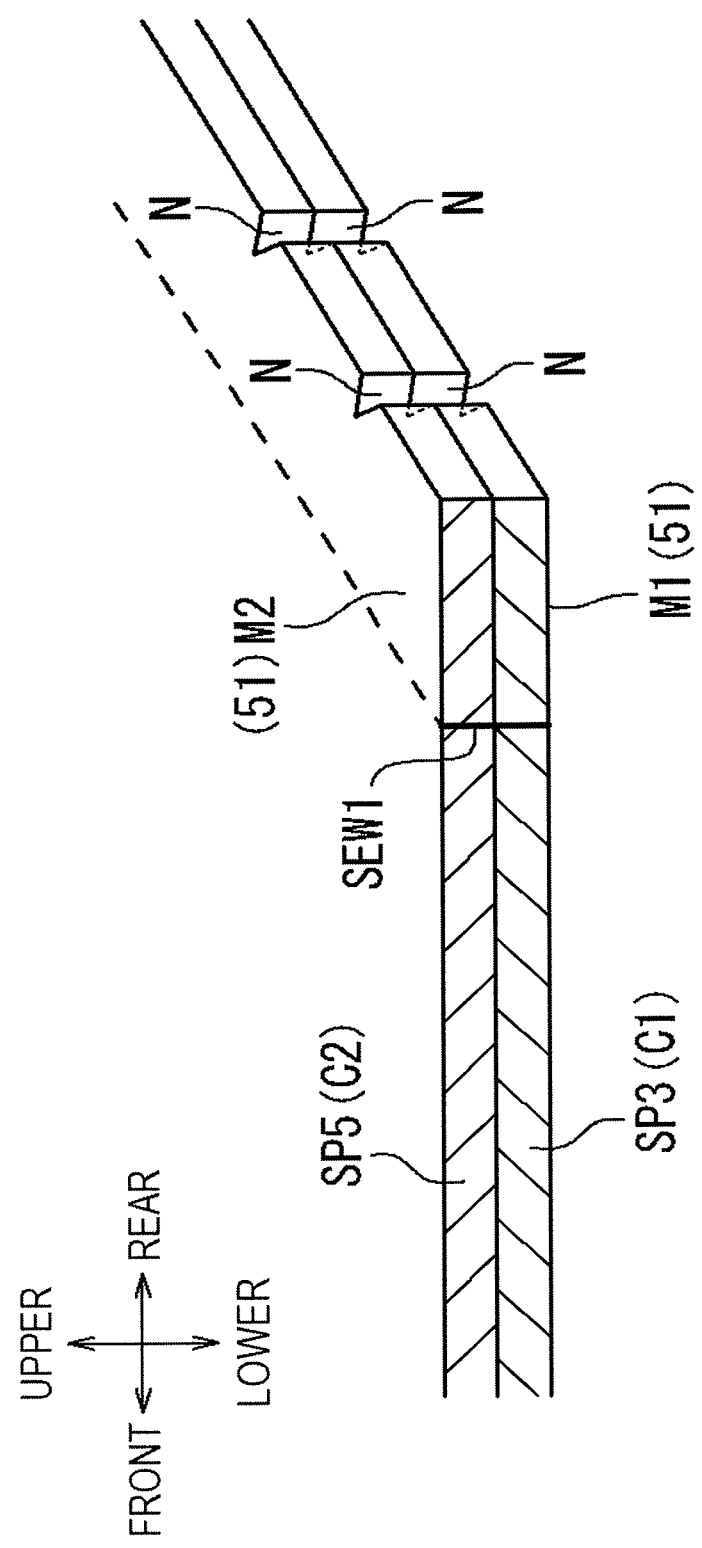
FIG. 12 is a perspective view of the first cover portion and a second cover portion when the seat cover is prepared.
Figure 14:
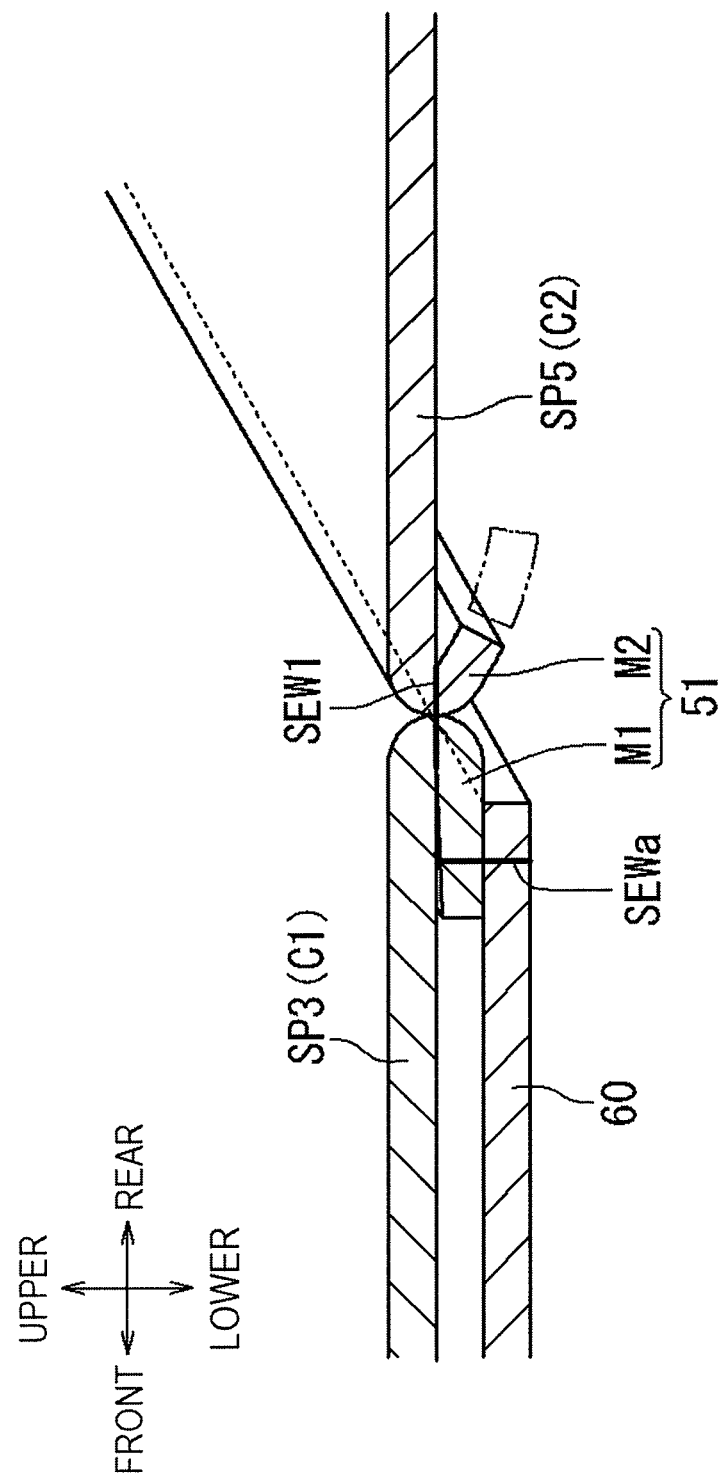
FIG. 14 is a perspective view showing each cover portion and the maintaining member in an unfolded manner.
Figure 15:
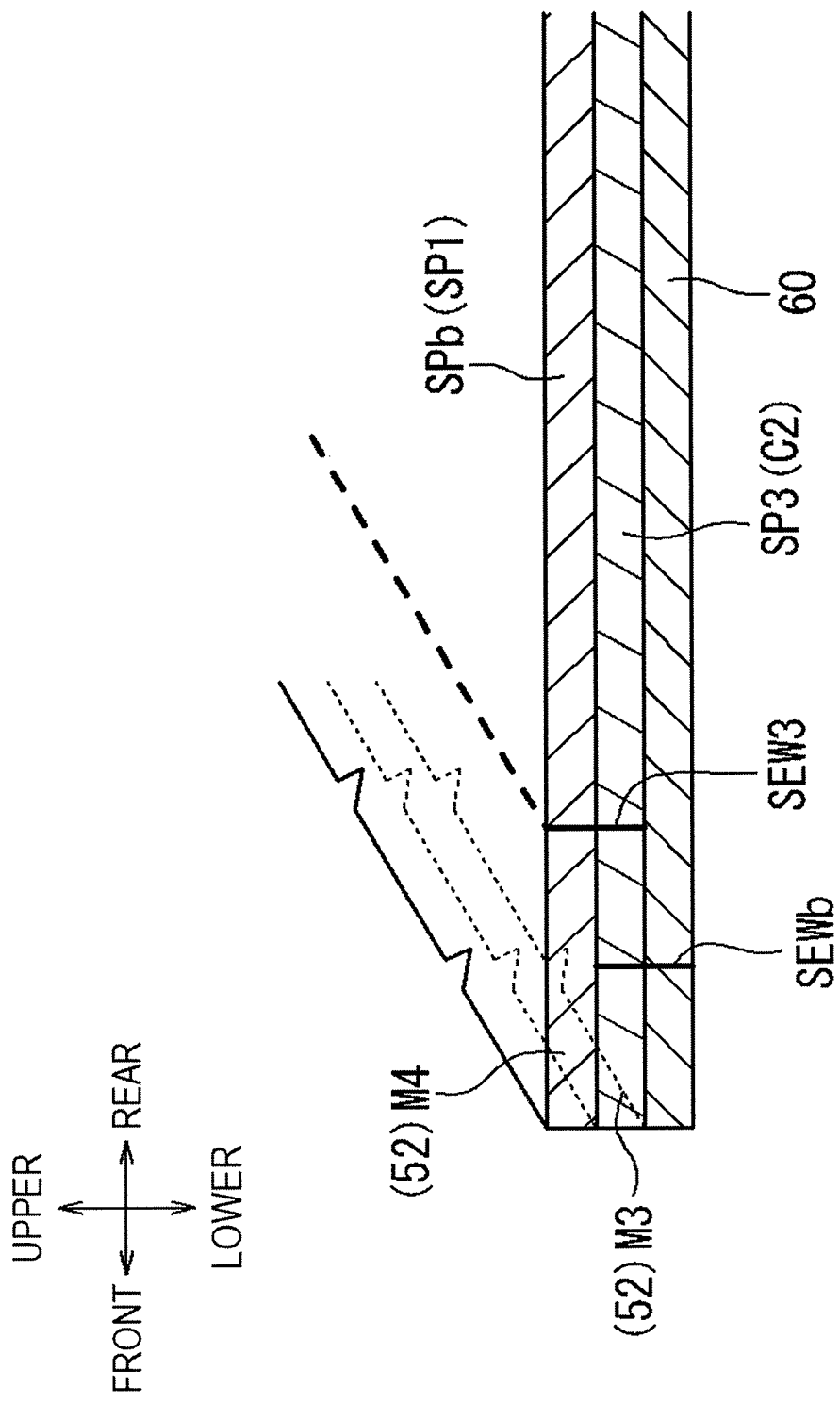
FIG. 15 is a perspective view of the first cover portion and other cover pieces when the seat cover is prepared.

The first cover portion C1 and the second cover portion C2 shown in FIG. 12 are sewn in the second step, and the cover portions C1 and C2 are sewn together to form the first sewn portion 51. In the second step, in a state where the first cover portion C1 and the second cover portion C2 are overlapped in a state of being turned back inwardly, the seam allowances M1 and M2 are sewn together by the first sewing line SEW1. At this time, the first seam allowance M1 and the second seam allowance M2 are provided with the mark portions N at appropriate intervals at corresponding positions shown in FIG. 6. Therefore, the first seam allowance M1 and the second seam allowance M2 are sewn together by the first sewing line SEW1 in a state where the mark portions N are aligned with the marks to form the first sewn portion 51. In a state where the first cover portion C1 and the second cover portion C2 are sewn together as shown in FIGS. 7 and 14, the first sewn portion 51 and the first sewing line SEW1 extend in the left-right direction, and the cover portions C1 and C2 are unfolded into a planar shape with the first sewing line SEW1 as a base point. Referring to FIG. 7, the rear end of the third sewn portion 53 extending in the front-rear direction intersects the first sewn portion 51.

[Third Step (Attaching Maintaining Member)]

Figure 13:
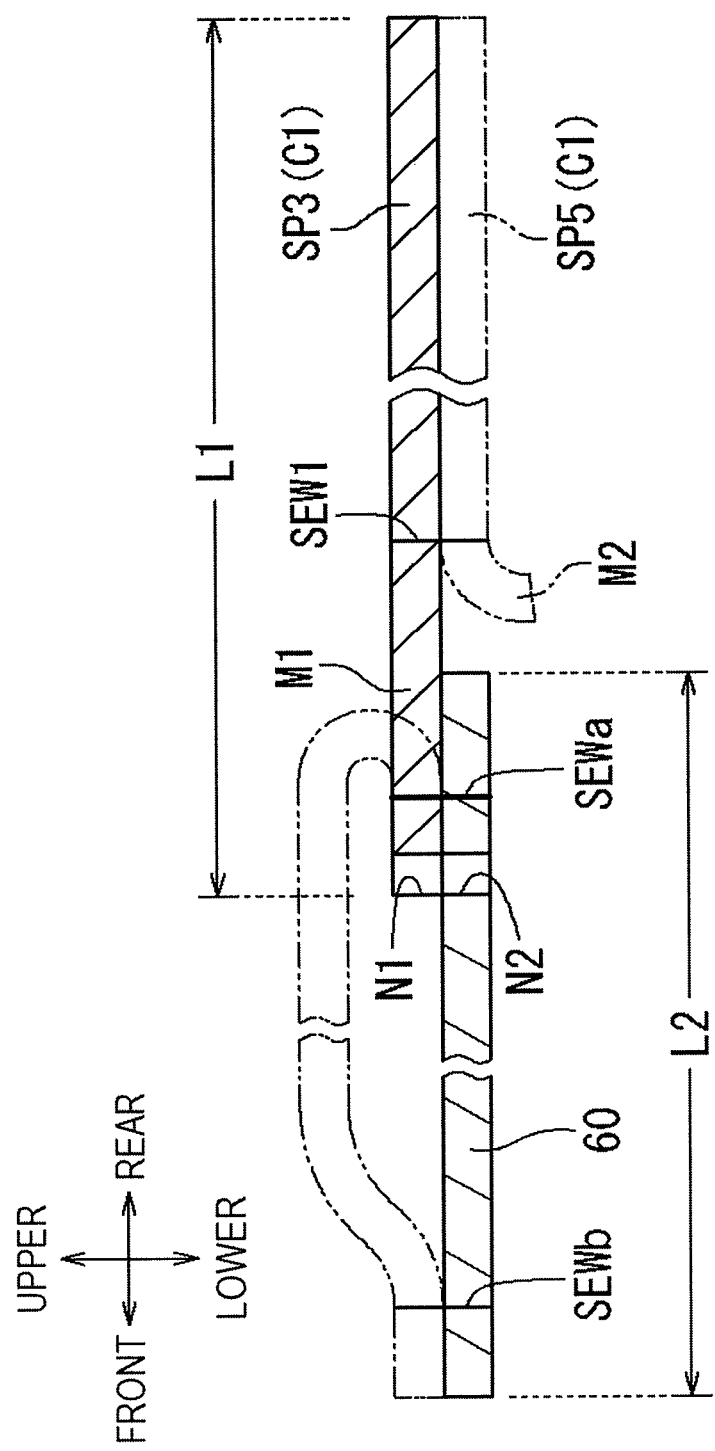
FIG. 13 is a perspective view of the first cover portion and a maintaining member when the seat cover is prepared.

The maintaining member 60 is aligned with and attached to the first cover portion C1 as shown in FIG. 13 in the third step. Here, referring to FIG. 5, a plurality of aligning portions N1 are provided at the first seam allowance M1 of the left cover piece SP3 forming the first cover portion C1, and the aligning portions N1 have substantially the same configuration as the mark portions N. The maintaining member 60 is provided with a plurality of aligned portions H1. The plurality of aligned portions H1 are through holes provided on a rear portion side of the maintaining member 60, and are arranged at positions facing the corresponding aligning portions N1 respectively. Therefore, referring to FIG. 13, while the first seam allowance M1 and the maintaining members 60 are arranged to be shifted in the front-rear direction, aligned portions H1 of the rear portion of the maintaining members 60 are overlapped with the aligning portions N1 so as to be aligned at appropriate positions. In this state, the maintaining member 60 can be attached to the first seam allowance M1 by sewing the first seam allowance M1 and the maintaining members 60 together by a rear sewing line SEWa. In the present embodiment, referring to FIGS. 7 and 14, a rear side of the maintaining member 60 can be directly overlapped and attached to, without folding back, the first seam allowance M1 that is folded back and tilted forward. After the third step, a front portion of the maintaining member 60 can be sewn to a front edge of the first cover portion C1 by a front sewing line SEWb (refer to the first cover portion illustrated by the dotted line in FIG. 13).

[Shortening of Second Seam Allowance]

Here, the second seam allowance M2 of the second cover portion C2 is shortened on the curved sewn portion 51b as shown in FIG. 7. The shortening of the second seam allowance M2 can be performed during each step described above, and is preferably performed before the third step. That is, referring to FIGS. 13 and 14, by shortening the second seam allowance M2 before the maintaining member 60 is attached, the maintaining member 60 can be attached to the first seam allowance M1 without being interfered by the second seam allowance M2 as much as possible.

[Fourth Step (Forming the Second Sewn Portion)]

Figure 16:
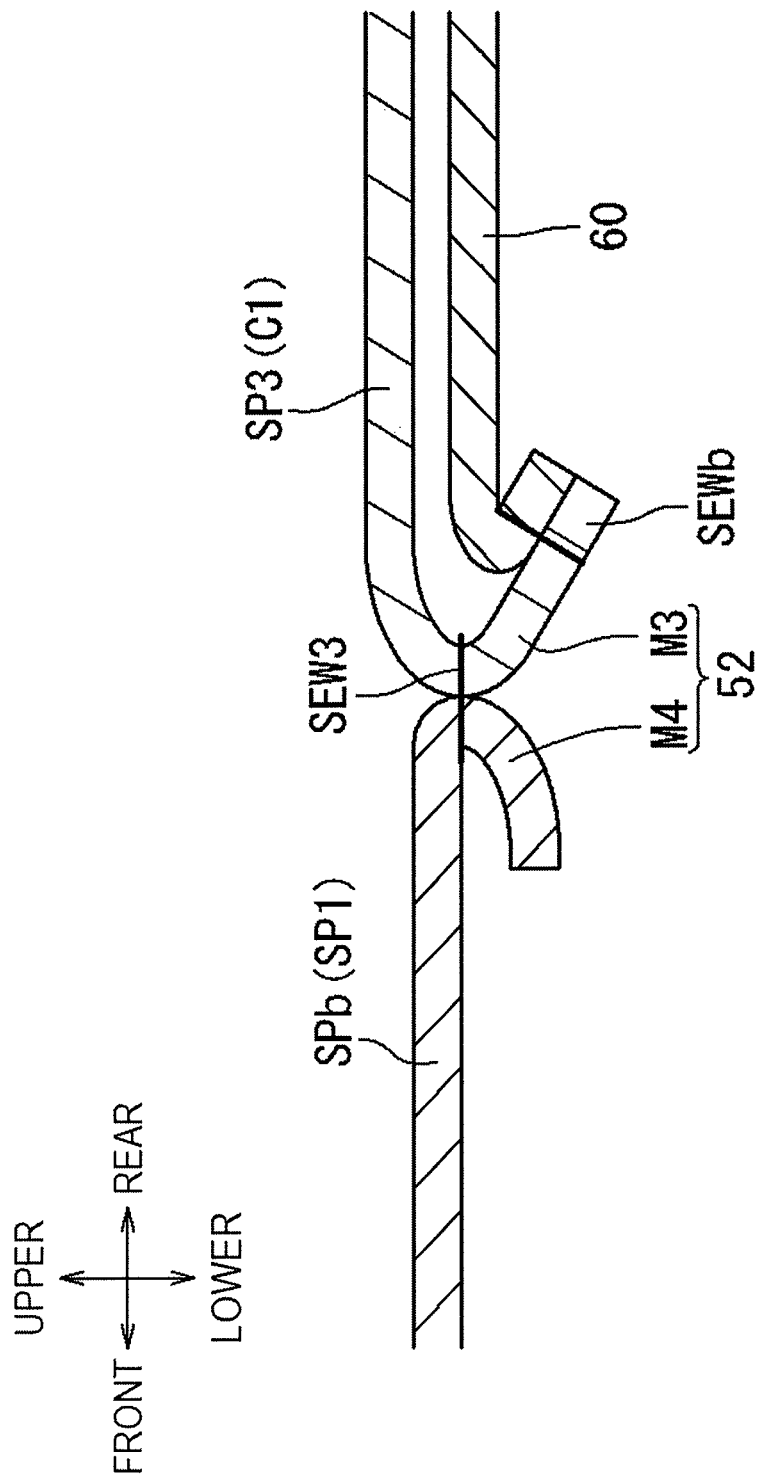
FIG. 16 is a perspective view of the first cover portion and the other cover pieces in an unfolded manner.

In the fourth step, the first cover portion C1 and the second cover portion C2 are sewn to the other cover pieces such as SP1 and SP2 shown in FIG. 1 to form the seat cover 6S. For example, referring to FIG. 15, the first cover portion C1 (maintaining member 60) and the front cover piece SP1 are sewn together to form the second sewn portion 52. At this time, in a state where the first cover portion C1 (maintaining member 60) and the front cover piece SP1 are overlapped in a state of being turned back inwardly, the seam allowances M3 and M4 are sewn together by the second sewing line SEW2. The mark portions N are provided on the front seam allowance M3 (and the front edges of the maintaining members 60) and the upper seam allowance M4 at appropriate intervals at corresponding positions shown in FIG. 6. Therefore, the front seam allowance M3 and the upper seam allowance M4 are sewn together by the second sewing line SEW2 in a state where the mark portions N are aligned with the marks to form the second sewn portion 52. In a state where the first cover portion C1 and the front cover piece SP1 are sewn together as shown in FIGS. 7 and 16, the second sewn portion 52 and the second sewing line SEW2 extend in the left-right direction, and the first cover portion C1 and the front cover piece SP1 are unfolded into a planar shape with the second sewing line SEW2 as a base point. A front side of the maintaining member 60 is attached to the front seam allowance M3 forming the second sewn portion 52 (the opposite side sewn portion) by the front sewing line SEWb. Therefore, the seat cover 6S can be formed by sewing the other cover pieces to the cover portions C1 and C2 by the same procedure.

[Covering Seat Cover to Seat Pad]

Referring to FIGS. 7 and 8, in the forming the seat back 6, the seat pad 6P is covered with the seat cover 6S, and the design surface of the seat back 6 is configured by the seat cover 6S. At this time, the upper surface portion 16 (first surface portion SF1) of the seat pad 6P is covered with the first cover portion C1, and the rear surface portion 18 (second surface portion SF2) is covered with the second cover portion C2. The first sewn portion 51, which is a sewn position of the cover portions C1 and C2, is arranged across the general edge portion 21 and the curved edge portion 22 of the peripheral edge portion 20 of the seat pad 6P. In this type of seat configuration, the occurrence of unevenness due to a peripheral length difference of the seam allowance of the first sewn portion 51 should be prevented as much as possible in the seat cover portion covering the curved edge portion 22. Further, in this type of configuration, in consideration of the appearance or the like of the other vehicle seats 2X shown in FIG. 2, it is desirable to arrange the first sewn portion 51 of the seat cover 6S in a more natural way with good appearance on the curved edge portion 22 of the peripheral edge of the seat pad 6P.

Therefore, referring to FIGS. 7 to 10, the first sewn portion 51 of the present embodiment is divided into the general sewn portion 51a arranged at the general edge portion 21 and the curved sewn portion 51b arranged at the curved edge portion 22. The curved sewn portion 51b shown in FIGS. 7 and 8 is formed of the first seam allowance M1 and the second seam allowance M2 which is shorter than the first seam allowance M1, and the first seam allowance M1 is tilted toward the first cover portion C1 side so as to be arranged in a manner of facing the first surface portion SF1. As described above, in the present embodiment, the curved sewn portion 51b, in which different lengths are intentionally provided for the first seam allowance M1 and the second seam allowance M2, is arranged at the curved edge portion 22 of the seat pad 6P. The second seam allowance M2 is configured to be short and not tilted to the front side, and the occurrence of the peripheral length difference with the first seam allowance M1 is avoided (the influence of the peripheral length difference is reduced), so that it is possible to prevent the unevenness from occurring in the portion of the seat cover 6S covering the curved edge portion 22 as much as possible. Further, by tilting the relatively long first seam allowance M1 toward the seat pad 6P side, an appropriate thickness is generated in the portion of the seat cover 6S to be a moderately raised state. Therefore, the vehicle seat 2 can be avoided from giving an impression that a part of the seat peripheral edge is unnaturally recessed as much as possible, and thus the vehicle seat 2 has an appearance similar to the corresponding portion of the other vehicle seats 2X shown in FIG. 2. In the present embodiment, the curved edge portion 22 of the seat pad 6P is provided at the corner portion on the upper side (left shoulder 6b) of the seat back 6 which is relatively conspicuous. Even in such a case, the first sewn portion 51 of the seat cover 6S can be arranged in a more natural way with good appearance on the curved portion of the peripheral edge of the seat pad 6P.

Further, in the present embodiment, with reference to FIG. 7, the first seam allowance M1 of the first sewn portion 51 is tilted forward and suitably maintained in a state of being tilted toward the first cover portion C1 side by the maintaining member 60 which is relatively less stretchable. Further, excessive increase in the thickness of the seat cover 6S due to the maintaining member 60 can be avoided as much as possible by attaching the maintaining member 60 to the first seam allowance M1 without folding back. Since the maintaining member 60 is shorter than the first cover portion C1 in the front-rear direction, the maintaining member 60 is kept in a state of being stretched appropriately without loosening (tension is applied in the front-rear direction), and a tilted state of the first seam allowance M1 can be maintained more reliably.

The first seam allowance M1 and the second seam allowance M2 of the general sewn portion 51a shown in FIGS. 9 and 10 are the same in length as the first seam allowance M1 of the curved sewn portion 51b and are tilted in the same direction. As described above, in the present embodiment, since it is not necessary to change the length of the second seam allowance M2 in the general sewn portion 51a, the configuration of the seat cover 6S can be simplified. In the vehicle seat 2, the seam allowance configuration of the general sewn portions 51a and the seam allowance configuration of the curved sewn portions 51b are substantially the same except for the second seam allowance M2. Therefore, a portion of the seat cover 6S from the general sewn portion 51a to the curved sewn portion 51b has a similar appearance and contributes to improving the design of the vehicle seat 2. In particular, in the present embodiment, with reference to FIGS. 3 and 7, the third sewn portion 53 (other sewn portion) intersects the boundary between the curved sewn portion 51b and the general sewn portion 51a. Therefore, the third sewn portion 53 makes the boundary between the sewn portions 51a and 51b less conspicuous as possible, and thus the seat cover 6S can be arranged in a more natural way with good appearance.

In the present embodiment as described above, the curved sewn portion 51b, in which different lengths are intentionally provided for the first seam allowance M1 and the second seam allowance M2, is arranged at the curved edge portion 22 of the seat pad 6P. By shortening the second seam allowance M2 and reducing the influence of the peripheral length difference, it is possible to prevent the unevenness from occurring in the portion of the seat cover 6S covering the curved edge portion 22 as much as possible. Further, by tilting the relatively long first seam allowance M1 toward the seat pad 6P side, it is possible to avoid the seat cover 6S arranged at the curved edge portion 22 from becoming extremely thin as much as possible. Further, in the present embodiment, since it is not necessary to change the length of the second seam allowance M2 in the general sewn portion 51a, the configuration of the seat cover 6S can be simplified. Further, the present embodiment contributes to improving the appearance of the seat cover 6S by appropriately maintaining the tilted state of the first seam allowance M1 by the maintaining member 60. Further, in the present embodiment, excessive increase in the thickness of the seat cover 6S due to the maintaining member 60 can be avoided as much as possible by attaching the maintaining member 60 to the first seam allowance M1 without folding back the first seam allowance M1. Further, in the present embodiment, the relatively short maintaining member 60 can be more firmly attached to the first cover portion C1 via the first sewn portion 51 and the second sewn portion 52, and thus the tilted state of the first seam allowance M1 can be more reliably maintained. Further, in the present embodiment, it is possible to more reliably maintain the tilted state of the first seam allowance M1 by the maintaining member 60 that is relatively less stretchable. Further, in the present embodiment, the boundary between the general sewn portion 51a and the curved sewn portion 51b is made less conspicuous as possible by intersecting with the third sewn portion 53 (other sewn portion), and thus the seat cover 6S can be arranged in a more natural way with good appearance. Further, in the present embodiment, the configuration of the general sewn portion 51a and the configuration of the curved sewn portion 51b can be smoothly changed without difficulty in the vicinity of the boundary therebetween by the dividing portion 55. Further, in the present embodiment, the curved edge portion 22 of the seat pad 6P is provided at the corner portion on the upper side (left shoulder 6b) of the seat back 6 which is relatively conspicuous. Even in such a case, the first sewn portion 51 of the seat cover 6S can be arranged in a more natural way with good appearance on the curved portion of the peripheral edge of the seat pad 6P. Therefore, according to the present embodiment, the sewn portion (51) of the seat cover 6S can be arranged in a more natural way with good appearance on the curved portion (22) of the peripheral edge of the seat pad 6P.

In the present embodiment, the seat cover 6S can be prepared in the first step to fourth step described above. At this time, in the third step, the maintaining member 60 is attached to the first seam allowance M1 in a state where the aligned portion H1 of the maintaining member 60 is aligned with the aligning portion N1 of the first seam allowance M1. Thus, the maintaining member 60 can be positioned at an appropriate position of the curved sewn portion 51b and attached to the first seam allowance M1.

[Modification]

Here, take various configurations may be adopted as the configuration of the sewn portion in addition to the configuration described above. For example, referring to FIG. 17, the seat cover 6S of a seat back 6A according to the modification has substantially the same basic configuration as that of the seat cover of the embodiment. However, the first seam allowance M1 of the curved sewn portion 51b is tilted toward the second cover portion C2 side so as to be arranged in a manner of facing the rear surface portion 18 (second surface portion SF2), which is different from that in the embodiment. In the present modification, the curved sewn portion 51b, in which different lengths are intentionally provided for the first seam allowance M1 and the second seam allowance M2, is also arranged at the curved edge portion 22 of the seat pad 6P. Therefore, in the present modification, the sewn portion (51) of the seat cover 6S can also be arranged in a more natural way with good appearance on the curved portion (22) of the peripheral edge of the seat pad 6P.

Figure 17:
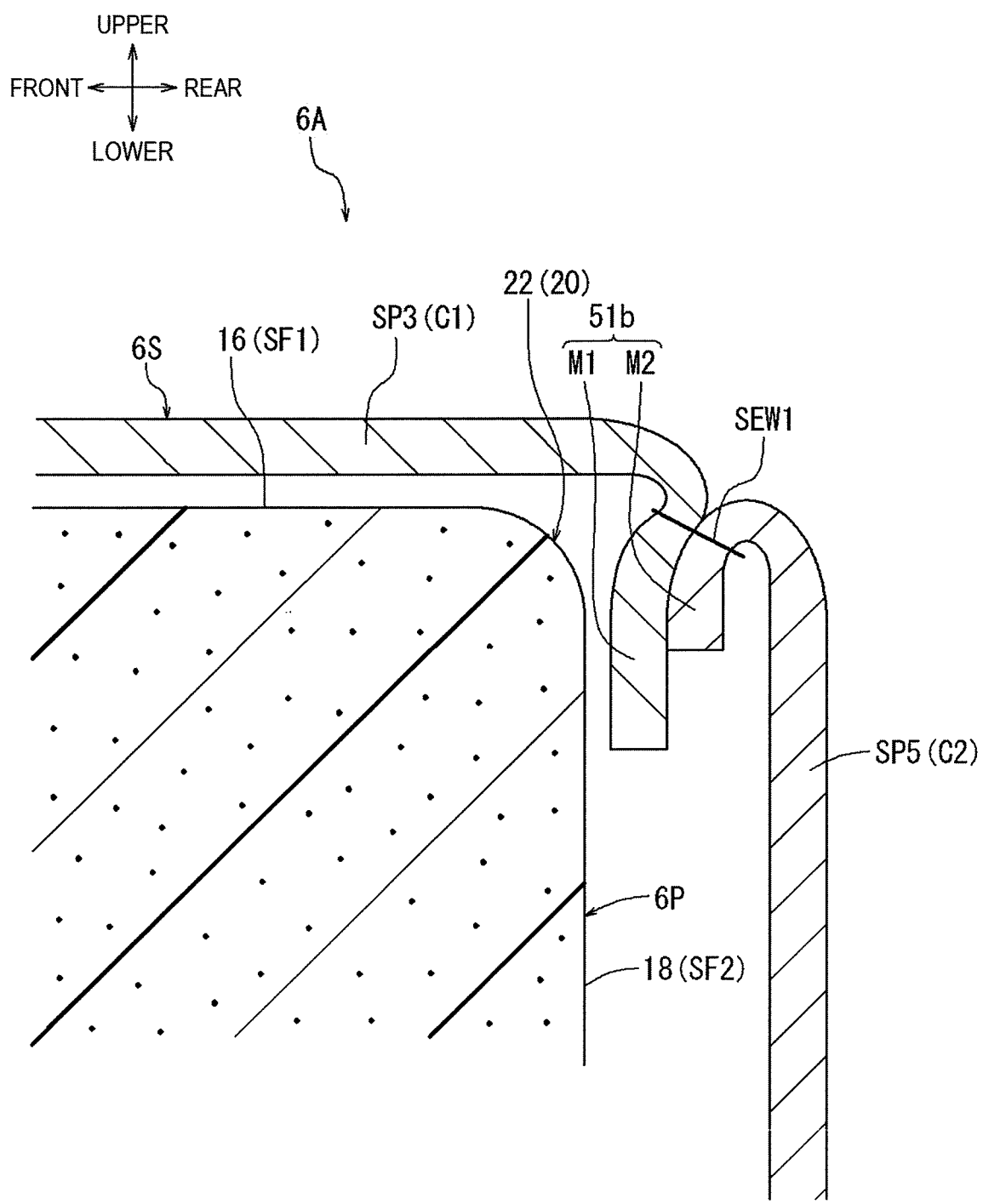
FIG. 17 is an enlarged cross-sectional view of a part of a seat back according to a modification.

As another example of the modification, the second seam allowance M2 illustrated in FIG. 17 may be long and the first seam allowance M1 may be short. In this case, the rear surface portion 18 corresponds to the first surface portion of the present disclosure, and the upper surface portion 16 corresponds to the second surface portion of the present disclosure. The rear cover piece corresponds to the first cover portion of the present disclosure, and the second seam allowance M2 corresponds to the first seam allowance of the present disclosure. In contrast, the right cover piece corresponds to the second cover portion of the present disclosure, and the first seam allowance M1 corresponds to the second seam allowance of the present disclosure.

The vehicle seat 2 of the present embodiment is not limited to the above embodiment, and various other embodiments may be adopted. In the present embodiment, the configuration (shape, dimension, number of each surface portion, arrangement position or the like) of the seat pad 6P is exemplified, and not intended to limit the configuration of the seat pad. For example, the first surface portion and the second surface portion can be appropriately selected from any one of the front surface portion, the right surface portion, the left surface portion, the upper surface portion, and the rear surface portion of the seat pad, and can also be set in one surface portion as necessary. The peripheral edge portion can be extended in an appropriate direction, such as the left-right direction which is the seat width direction, the front-rear direction, or the up-down direction, according to the arrangement relation between the first surface portion and the second surface portion. A curved shape of the curved edge portion can also be appropriately set in consideration of the design of the seat or the like. For example, the curved shape of the curved edge portion may be a curved shape protruding inwardly of the seat, and may also be a curved shape protruding outwardly of the seat. The general edge portion may be gradually curved as long as the curvature is smaller than that of the curved edge portion.

In the present embodiment, although the seat cover 6S is configured to include the first cover portion C1, the second cover portion C2, and each sewn portion 51 to 53, the configuration (shape, dimension, forming method, number of cover pieces or the like) of the seat cover can be changed as appropriate. For example, the first cover portion C1 and the second cover portion C2 can be arranged at appropriate positions according to the configuration of the seat pad, and each cover portion can be formed of a plurality of or one cover piece. In the sewn portion, the seam allowance configuration in the general sewn portion can also be the same as the seam allowance configuration in the curved sewn portion. In the present embodiment, although the other sewn portion intersects the sewn portion so as to form a substantially T-shape, the other sewn portion may intersect the sewn portion in a cross shape, and may also intersect the sewn portion at an acute angle or an obtuse angle. A plurality of other sewn portions can be provided as necessary, and can also be omitted. In the present embodiment, although each sewing line extends in a linear shape, each sewing line may extend in a curved shape (such as an arc shape or a wavy shape) or a bent shape (such as a stepwise shape or a zigzag shape) if possible. In the present embodiment, although the dividing portion is the slit shape, the dividing portion may be configured to have various shapes such as a notch shape, and can also be omitted. The seat cover forming method can also be changed as appropriate.

Further, in the present embodiment, the planar maintaining member 60 is exemplified, but it is not intended to limit the configuration (shape, dimension, arrangement position, attachment method to the cover portion, etc.) of the maintaining member. The maintaining member may be configured not to be attached to the opposite side sewn portion, and the tilted first seam allowance may be configured to be adhered to the back side of the corresponding cover portion by a tape-like maintaining member for example. Further, the first seam allowance can be adhered to the back side of the corresponding cover portion by an adhesive agent (adhesive layer) or an adhesive material (hot melt material) or the like as the maintaining member, and the first seam allowance can also be joined to the back side of the corresponding cover portion by a joining member such as a staple. The maintaining member can also be arranged at the general sewn portion side. The maintaining member can be omitted from the curved sewn portion as necessary. A method for attaching the maintaining member to the sewn portion can also be appropriately selected, for example, a method for attaching the maintaining member to the second sewn portion can be adopted. Although the configurations of the positioning portion of the first seam allowance and the positioned portion of the maintaining member are exemplified in the present embodiment, a slit, a projection portion, or a visually distinguishable colored portion can be used as the positioning portion and the positioned portion in addition to the hole and the notch, and at least one of these portions can be omitted.

Although the configuration of the vehicle seat is exemplified in the present embodiment, it is not intended to limit the configuration of the vehicle seat. For example, the design of the vehicle seat may be different from the design of the other vehicle seats. In the present embodiment, the seat back is described as an example, and the configuration of the present embodiment can be applied to various seat configuration members such as a seat cushion, an armrest, and a headrest. The configuration of the present embodiment can be applied to vehicle seats such as vehicles, aircrafts, trains, and ships in general.

The disclosure provides illustrative, non-limiting examples as follows:

A first aspect of the present disclosure is a vehicle seat including: a seat pad which forms a seat outer shape, the seat pad including: a first surface portion; a second surface portion which is arranged orthogonal to the first surface portion; and a peripheral edge portion which forms a boundary between the first surface portion and the second surface portion, and a seat cover which covers the seat pad, the seat cover including: a first cover portion which covers the first surface portion; a second cover portion which covers the second surface portion; and a sewn portion in which a first seam allowance of the first cover portion and a second seam allowance of the second cover portion are overlapped in a state of being turned back inwardly and are sewn together by a sewing line, the sewn portion being arranged along the peripheral edge portion, and a portion of the sewn portion arranged along the peripheral edge portion is formed of the first seam allowance and the second seam allowance which is shorter than the first seam allowance, and the first seam allowance is tilted toward a corresponding cover portion side so as to be arranged in a manner of facing either the first surface portion or the second surface portion.

In the present disclosure, the portion of the sewn portion, in which different lengths are intentionally provided for the first seam allowance and second seam allowance, is arranged along the peripheral edge portion of the seat pad. By shortening the second seam allowance and reducing the influence of a peripheral length difference, it is possible to prevent unevenness from occurring in the seat cover portion covering the peripheral edge portion as much as possible. Further, by tilting the relatively long first seam allowance toward the seat pad side, it is possible to avoid the seat cover arranged at the peripheral edge portion from being extremely thin as much as possible.

According to the vehicle seat of the first aspect, in the vehicle seat of a second aspect, a general edge portion and a curved edge portion curved at a curvature larger than that of the general edge portion are continuously provided on the peripheral edge portion, and the sewn portion arranged at the curved edge portion is formed of the first seam allowance and the second seam allowance which is shorter than the first seam allowance, and the first seam allowance is tilted toward a corresponding cover portion side so as to be arranged in a manner of facing either the first surface portion or the second surface portion.

In the present disclosure, the sewn portion, in which different lengths are intentionally provided for the first seam allowance and second seam allowance, is arranged at the curved edge portion of the seat pad. By shortening the second seam allowance and reducing the influence of a peripheral length difference, it is possible to prevent unevenness from occurring in the seat cover portion covering the curved edge portion as much as possible. Further, by tilting the relatively long first seam allowance toward the seat pad side, it is possible to avoid the seat cover arranged at the curved edge portion from being extremely thin as much as possible.

According to the vehicle seat of the second aspect, in the vehicle seat of a third aspect, the sewn portion is divided into a general sewn portion which is arranged at the general edge portion, and a curved sewn portion which is arranged at the curved edge portion, and the first seam allowance and the second seam allowance in the general sewn portion are the same in length as the first seam allowance in the curved sewn portion, and are tilted in the same direction.

In the present disclosure, since it is not necessary to change the length of the second seam allowance at the general sewn portion, the configuration of the seat cover can be simplified.

According to the vehicle seat of the second aspect, in the vehicle seat of a fourth aspect, the sewn portion is divided into a general sewn portion which is arranged at the general edge portion, and a curved sewn portion which is arranged at the curved edge portion, and the seat cover includes a maintaining member which maintains the first seam allowance in the curved sewn portion in a state of being tilted toward the corresponding cover portion side.

The present disclosure contributes to improving the appearance of the seat cover by appropriately maintaining the tilted state of the first seam allowance by the maintaining member.

According to the vehicle seat of the fourth aspect, in the vehicle seat of a fifth aspect, the maintaining member having a planar shape is attached to the first seam allowance that is tilted in a state of overlapping with the first seam allowance without being folded back.

In the present disclosure, excessive increase in the thickness of the seat cover due to the maintaining member can be avoided as much as possible by attaching the maintaining member to the first seam allowance without being folded back.

According to the vehicle seat of the fourth aspect, in the vehicle seat of a sixth aspect, the first cover portion includes: the sewn portion which is provided at one edge portion of the first cover portion; and an opposite side sewn portion which is provided at the other edge portion of the first cover portion located at an opposite side of the one edge portion, and the maintaining member is a planar member shorter than a length from the one edge portion to the other edge portion of the first cover portion, and one end side of the maintaining member is attached to the sewn portion, and the other end side of the maintaining member opposite to the one end is attached to the opposite side sewn portion.

In the present disclosure, it is possible to maintain the tilted state of the first seam allowance more reliably by further firmly attaching the relatively short maintaining member to the first cover portion via the sewn portion and the opposite side sewn portion.

According to the vehicle seat of the fourth aspect, in the vehicle seat of a seventh aspect, the maintaining member is a planar member which is less stretchable than the seat cover.

In the present disclosure, it is possible to more reliably maintain the tilted state of the first seam allowance by the maintaining member which is relatively less stretchable.

According to the vehicle seat of the third aspect, in the vehicle seat of an eighth aspect, the seat cover is provided with other sewn portion extending in a direction different from the sewn portion, and the other sewn portion intersects the sewn portion at a boundary between the general sewn portion and the curved sewn portion.

In the present disclosure, the boundary between the general sewn portion and the curved sewn portion is made as less conspicuous as possible by intersecting with the other sewn portion, and thus the seat cover can be arranged in a more natural way with good appearance.

According to the vehicle seat of the third aspect, in the vehicle seat of a ninth aspect, the sewn portion is provided with a dividing portion which divides the second seam allowance in the general sewn portion and the second seam allowance in the curved sewn portion.

In the present disclosure, the configuration of the general sewn portion and the configuration of the curved sewn portion can be smoothly changed without difficulty in the vicinity of the boundary therebetween by the dividing portion.

According to the vehicle seat of the second aspect, in the vehicle seat of a tenth aspect, the seat pad of a seat back that is a backrest of an occupant includes a first surface which forms an upper surface and a second surface which forms a rear surface, and the curved edge portion is provided at a corner portion of an upper side of the first surface in a seat width direction.

In the present disclosure, the curved edge portion of the seat pad is provided at a corner portion on an upper side (shoulder) of the seat back which is relatively conspicuous. Even in such a case, the sewn portion of the seat cover can be arranged in a more natural way with good appearance on the curved portion of the peripheral edge of the seat pad.

A preparing method for a seat cover of an eleventh aspect is a forming method for the seat cover of the vehicle seat according to the second aspect, the sewn portion is divided into a general sewn portion which is arranged at the general edge portion and a curved sewn portion which is arranged at the curved edge portion, the seat cover includes a maintaining member which maintains the first seam allowance in the curved sewn portion in a state of being tilted toward the corresponding cover portion side, and the maintaining member is attached to the first seam allowance in a state where an aligned portion of the maintaining member is aligned with an aligning portion of the first seam allowance.

In the present disclosure, the maintaining member can be positioned and attached at an appropriate position of the curved sewn portion.

According to the first aspect of the present disclosure, the sewn portion of the seat cover can be arranged in a more natural way with good appearance on the portion of the peripheral edge of the seat pad. According to the second aspect of the present disclosure, the sewn portion of the seat cover can be arranged in a more natural way with good appearance on the curved portion of the peripheral edge of the seat pad. According to the third aspect, the sewn portion of the seat cover can be arranged with good appearance on the peripheral edge of the seat pad with a relatively simple configuration. According to the fourth aspect, the sewn portion of the seat cover can be arranged with better appearance on the curved portion of the peripheral edge of the seat pad. According to the fifth aspect, the sewn portion of the seat cover can be more reliably arranged in a natural way on the curved portion of the peripheral edge of the seat pad. According to the sixth aspect, the sewn portion of the seat cover can be more reliably arranged with good appearance on the curved portion of the peripheral edge of the seat pad. According to the seventh aspect, the sewn portion of the seat cover can be more reliably arranged with good appearance on the curved portion of the peripheral edge of the seat pad. According to the eighth aspect, the sewn portion of the seat cover can be more reliably arranged in a natural way on the curved portion of the peripheral edge of the seat pad. According to the ninth aspect, the sewn portion of the seat cover can be appropriately arranged in a more natural way on the curved portion of the peripheral edge of the seat pad. According to the tenth aspect, in the seat back, the sewn portion of the seat cover can be arranged in a more natural way with better appearance on the curved portion of the peripheral edge of the seat pad. According to the eleventh aspect, it is possible to appropriately form the seat cover including the sewn portion which should be arranged more naturally with good appearance.

What is claimed is:

1. A vehicle seat comprising:
   a seat pad which forms a seat outer shape, the seat pad including:
      a first surface portion;
      a second surface portion which is arranged orthogonal to the first surface portion; and
      a peripheral edge portion which forms a boundary between the first surface portion and the second surface portion, and
   a seat cover which covers the seat pad, the seat cover including:
      a first cover portion which covers the first surface portion;
      a second cover portion which covers the second surface portion; and
      a sewn portion in which a first seam allowance of the first cover portion and a second seam allowance of the second cover portion are overlapped in a state of being turned back inwardly and are sewn together by a sewing line, the sewn portion being arranged along the peripheral edge portion,
   wherein a portion of the sewn portion arranged along the peripheral edge portion is formed of the first seam allowance and the second seam allowance which is shorter than the first seam allowance, and the first seam allowance is tilted toward a corresponding cover portion side so as to be arranged in a manner of facing either the first surface portion or the second surface portion,
   wherein a general edge portion and a curved edge portion curved at a curvature larger than that of the general edge portion are continuously provided on the peripheral edge portion,
   wherein the sewn portion arranged at the curved edge portion is formed of the first seam allowance and the second seam allowance which is shorter than the first seam allowance, and the first seam allowance is tilted toward a corresponding cover portion side so as to be arranged in a manner of facing either the first surface portion or the second surface portion,
   wherein the sewn portion is divided into a general sewn portion which is arranged at the general edge portion, and a curved sewn portion which is arranged at the curved edge portion, and
   wherein the first seam allowance and the second seam allowance in the general sewn portion are the same in length as the first seam allowance in the curved sewn portion.

2. The vehicle seat according to claim 1,
   wherein the first seam allowance and the second seam allowance in the general sewn portion and are tilted in the same direction.

3. The vehicle seat according to claim 2,
   wherein the seat cover is provided with other sewn portion extending in a direction different from the sewn portion, and the other sewn portion intersects the sewn portion at a boundary between the general sewn portion and the curved sewn portion.

4. The vehicle seat according to claim 2,
   wherein the sewn portion is provided with a dividing portion which divides the second seam allowance in the general sewn portion and the second seam allowance in the curved sewn portion.

5. The vehicle seat according to claim 1,
wherein the seat cover includes a maintaining member which maintains the first seam allowance in the curved sewn portion in a state of being tilted toward the corresponding cover portion side.

6. The vehicle seat according to claim 5,
wherein the maintaining member having a planar shape is attached to the first seam allowance that is tilted in a state of overlapping with the first seam allowance without being folded back.

7. The vehicle seat according to claim 5,
wherein the first cover portion includes:
the sewn portion which is provided at one edge portion of the first cover portion; and
an opposite side sewn portion which is provided at the other edge portion of the first cover portion located at an opposite side of the one edge portion, and
wherein the maintaining member is a planar member shorter than a length from the one edge portion to the other edge portion of the first cover portion, and one end side of the maintaining member is attached to the sewn portion, and the other end side of the maintaining member opposite to the one end is attached to the opposite side sewn portion.

8. The vehicle seat according to claim 5,
wherein the maintaining member is a planar member which is less stretchable than the seat cover.

9. The vehicle seat according to claim 1,
wherein the seat pad of a seat back that is a backrest of an occupant includes a first surface which forms an upper surface and a second surface which forms a rear surface, and
wherein the curved edge portion is provided at a corner portion of an upper side of the first surface in a seat width direction.

10. A forming method for the seat cover of the vehicle seat according to claim 1,
wherein the seat cover includes a maintaining member which maintains the first seam allowance in the curved sewn portion in a state of being tilted toward the corresponding cover portion side, and
wherein the maintaining member is attached to the first seam allowance in a state where an aligned portion of the maintaining member is aligned with an aligning portion of the first seam allowance.

11. A vehicle seat comprising:
a seat pad which forms a seat outer shape, the seat pad including:
a first surface portion;
a second surface portion which is arranged orthogonal to the first surface portion; and
a peripheral edge portion which forms a boundary between the first surface portion and the second surface portion, and
a seat cover which covers the seat pad, the seat cover including:
a first cover portion which covers the first surface portion;
a second cover portion which covers the second surface portion; and
a sewn portion in which a first seam allowance of the first cover portion and a second seam allowance of the second cover portion are overlapped in a state of being turned back inwardly and are sewn together by a sewing line, the sewn portion being arranged along the peripheral edge portion,
wherein a portion of the sewn portion arranged along the peripheral edge portion is formed of the first seam allowance and the second seam allowance which is shorter than the first seam allowance, and the first seam allowance is tilted toward a corresponding cover portion side so as to be arranged in a manner of facing either the first surface portion or the second surface portion,
wherein a general edge portion and a curved edge portion curved at a curvature larger than that of the general edge portion are continuously provided on the peripheral edge portion,
wherein the sewn portion arranged at the curved edge portion is formed of the first seam allowance and the second seam allowance which is shorter than the first seam allowance, and the first seam allowance is tilted toward a corresponding cover portion side so as to be arranged in a manner of facing either the first surface portion or the second surface portion,
wherein the sewn portion is divided into a general sewn portion which is arranged at the general edge portion, and a curved sewn portion which is arranged at the curved edge portion,
wherein the seat cover includes a maintaining member which maintains the first seam allowance in the curved sewn portion in a state of being tilted toward the corresponding cover portion side, and
wherein the maintaining member having a planar shape is attached to the first seam allowance that is tilted in a state of overlapping with the first seam allowance without being folded back.

12. A vehicle seat comprising:
a seat pad which forms a seat outer shape, the seat pad including:
a first surface portion;
a second surface portion which is arranged orthogonal to the first surface portion; and
a peripheral edge portion which forms a boundary between the first surface portion and the second surface portion, and
a seat cover which covers the seat pad, the seat cover including:
a first cover portion which covers the first surface portion;
a second cover portion which covers the second surface portion; and
a sewn portion in which a first seam allowance of the first cover portion and a second seam allowance of the second cover portion are overlapped in a state of being turned back inwardly and are sewn together by a sewing line, the sewn portion being arranged along the peripheral edge portion,
wherein a portion of the sewn portion arranged along the peripheral edge portion is formed of the first seam allowance and the second seam allowance which is shorter than the first seam allowance, and the first seam allowance is tilted toward a corresponding cover portion side so as to be arranged in a manner of facing either the first surface portion or the second surface portion,
wherein a general edge portion and a curved edge portion curved at a curvature larger than that of the general edge portion are continuously provided on the peripheral edge portion,
wherein the sewn portion arranged at the curved edge portion is formed of the first seam allowance and the second seam allowance which is shorter than the first seam allowance, and the first seam allowance is tilted toward a corresponding cover portion side so as to be arranged in a manner of facing either the first surface portion or the second surface portion, wherein the sewn portion is divided into a general sewn portion which is arranged at the general edge portion, and a curved sewn portion which is arranged at the curved edge portion, wherein the seat cover includes a maintaining member which maintains the first seam allowance in the curved sewn portion in a state of being tilted toward the corresponding cover portion side, wherein the first cover portion includes:
   the sewn portion which is provided at one edge portion of the first cover portion; and
   an opposite side sewn portion which is provided at the other edge portion of the first cover portion located at an opposite side of the one edge portion, and wherein the maintaining member is a planar member shorter than a length from the one edge portion to the other edge portion of the first cover portion, and one end side of the maintaining member is attached to the sewn portion, and the other end side of the maintaining member opposite to the one end is attached to the opposite side sewn portion.

\* \* \* \* \*